US012708903B2

(12) United States Patent
Wu et al.

(10) Patent No.: US 12,708,903 B2
(45) Date of Patent: Aug. 18, 2026

(54) NUCLEIC ACID AMPLIFICATION SYSTEM AND METHOD THEREOF

(71) Applicant: Chang Gung University, Taoyuan (TW)

(72) Inventors: Min-Hsien Wu, Taoyuan (TW); Chih-Yu Chen, Taoyuan (TW)

(73) Assignee: Chang Gung University, Taoyuan (TW)

( * ) Notice: Subject to any disclaimer, the term of this patent is extended or adjusted under 35 U.S.C. 154(b) by 534 days.

(21) Appl. No.: 18/029,415

(22) PCT Filed: Nov. 25, 2020

(86) PCT No.: PCT/CN2020/131461

§ 371 (c)(1),
(2) Date: Mar. 30, 2023

(87) PCT Pub. No.: WO2022/109863

PCT Pub. Date: Jun. 2, 2022

(65) Prior Publication Data

US 2023/0405597 A1 Dec. 21, 2023

(51) Int. Cl.
*B01L 7/00* (2006.01)

(52) U.S. Cl.
CPC .................................... *B01L 7/52* (2013.01)

(58) Field of Classification Search
CPC ................................ B01L 7/52; C12Q 1/6844
See application file for complete search history.

(56) References Cited

U.S. PATENT DOCUMENTS

| | | | | |
|---|---|---|---|---|
| 2018/0179515 | A1* | 6/2018 | Cho | C12N 15/1013 |
| 2018/0237824 | A1 | 8/2018 | Buersgens et al. | |

FOREIGN PATENT DOCUMENTS

| | | | |
|---|---|---|---|
| CN | 101063128 | A | 10/2007 |
| CN | 101139636 | A | 3/2008 |
| CN | 101551385 | A | 10/2009 |
| CN | 104561243 | A | 4/2015 |
| CN | 108753941 | * | 11/2018 |
| CN | 108753941 | A | 11/2018 |
| CN | 109321637 | A | 2/2019 |
| CN | 111518948 | A | 8/2020 |
| TW | I765431 | B | 5/2022 |
| WO | 2017127570 | A1 | 7/2017 |

OTHER PUBLICATIONS

You et al ., Trends in Biotechnology, 38, 6, 637-649, Epub Jan. 6, 2020.*

Sang Hun Lee et al., Emerging ultrafast nucleic acid amplification technologies for next-generation molecular diagnostics, Biosensors and Bioelectronics 141 (2019) 111448.

Soo Kyung Kim et al., Photothermolysis of immobilized bacteria on gold nanograil arrays, Applied Physics Letters 98, 233701 (2011).

International Search Report of PCT/CN2020/131461, Sep. 1, 2021.

* cited by examiner

*Primary Examiner* — Cynthia B Wilder

(74) *Attorney, Agent, or Firm* — Troutman Pepper Locke LLP; Tim Tingkang Xia, Esq.

(57) ABSTRACT

A nucleic acid amplification system and a method thereof. An external energy source is used to drive nanoparticles with a regional thermal transfer to generate an energy response, so that the target nucleic acids on the nanoparticles are subjected to a polymerase chain reaction (PCR) or a nucleic acid isothermal amplification reaction, and the liquid in the reaction space is used for refrigeration to achieve rapid temperature regulation, such that the target nucleic acids accumulated on the surface of the nanoparticles are amplified. The concentration, capture and collection of the nanoparticles can be carried out by means of centrifugation, magnetic capture, lateral flow chromatography, etc. Subsequently, detection can be carried out by means of analyzing the fluorescence intensity and the color change of the layer after amplification.

18 Claims, 20 Drawing Sheets

NUCLEIC ACID AMPLIFICATION SYSTEM AND METHOD THEREOF

REFERENCE TO RELATED APPLICATIONS

The present application is based on, and claims priority from, international application number PCT/CN2020/131461 filed Nov. 25, 2020, the disclosure of which is hereby incorporated by reference herein in its entirety.

FIELD OF THE INVENTION

The present invention relates to a nucleic acid amplification system using magnetic or non-magnetic nanoparticles that converts external energy into localized thermal energy by integrating photothermal heating, thereby performing nucleic acid amplification via polymerase chain reaction or isothermal amplification on the surface of the nanoparticles. In addition, the nanoparticles can be concentrated by single-molecule concentration procedures, such as centrifugation, magnetic capture, and lateral flow chromatography. The amplified target nucleic acids are detected by nucleic acid tags or antibodies, coupled with enzyme reactions, and followed by a colorimetric method to achieve rapid detection.

BACKGROUND OF THE INVENTION

For molecular biological detection of the trace nucleic acids from crude clinical samples, rapid nucleic acid amplification, and subsequent detection is the challenging bottleneck. In the past decade, owing to the manipulation of ultrafast thermal cycling and the second-generation DNA polymerase, rapid polymerase chain reaction (PCR) was demonstrated to be achieved within a few minutes. However, rapid PCR is also accompanied by many problems (i.e., low yield of the amplicons, scalability of the platform, and thermal management of the platform on thermal cycling). Rapid nucleic acid amplification and detection is the core technology of nucleic acid-based point-of-care testings (POCTs). As compared to conventional PCR instruments, the microfluidic-based nucleic acid platform is demonstrated that it is more technically superior, and is also widely used in the detection of trace nucleic acid samples. Although a portable Micro Electromechanical Systems (MEMS)-based microfluidic analysis device is implemented, such platforms need to be requires precise temperature control and microfluidic system operation. Therefore, it has relatively increases difficulty in design, process and operation in the microfluidic chips, and restricts for the development and the POCTs application. The subsequent nucleic acid detection technologies mostly depend on physical or chemical properties of labeled tags in target amplicons of nanoparticles, e.g., absorbance, fluorescence, concentration, electrical impedance, and even fluid viscosity, etc.

In the identification of cells, bacteria, or viruses, and even the screening of cancer cells such as the trace circulating tumor cells in the blood circulation system. Identification of specific antigens on the cell surface also plays an important role in the identification of cell markers. However, for circulating tumor cells, cell markers such as EpCAM or CKs would not be expressed on all circulating tumor cells. In addition, in the identification of some RNA viruses with high mutation rates on the structural protein. In conventional immunological-based POCTs application is restricted by the availability of corresponding antibodies detectable with high specificity and sensitivity, screening suitable monoclonal antibodies that are specific against unique antigens is time-consuming. Therefore, nucleic acid-based POCT detection is superior to immunological-based POCT detection. Moreover, nucleic acid based detection can increase the concentration of the target amplicons through nucleic acid amplifications to improve the analytical sensitivity for subsequent detection.

For instance, if screening for specific cancer cells, bacteria, or viruses is necessary, most existing technologies need an extra and complicated procedure to release antigens or nucleic acids from target cells. Even if nucleic acids or antigens are released, it is more likely that low target cell concentration is too low in samples, resulting in analytical devices (e.g., biochips) need to accumulate sufficient target analytes to perform their functions.

Therefore, relevant biological detection often requires multiple steps, such as screening, cultivating, controlling the concentration of samples, selecting appropriate detection instruments, and finally performing data analysis, resulting in many difficulties in instrument integration. Currently, a set of systems and methods that can solve the problems mentioned above without losing detection accuracy is needed.

SUMMARY OF THE INVENTION

In order to solve the problems mentioned in the prior art, the present disclosure provides a nucleic acid amplification system and a method thereof, wherein the thermal cycling of the nucleic acid amplification is performed in a thermal conduction method instead of using a metal heating carrier or a cooling fan.

The nucleic acid amplification system mainly comprises a reaction space, a sample, a plurality of particles, at least one enzyme, at least one energy supply module, at least one temperature equilibrium substance, and an operating module.

The sample includes at least one analyte, placed in the reaction space. The plurality of particles mixed with the sample, each including a body, at least one first ligand, and at least one second ligand. The at least one first ligand is functionalized on the body, matching the at least one analyte. The at least one second ligand is functionalized on the body, and each second ligand contains a specific tag.

At least one enzyme is mixed with the sample. At least one energy supply module provides external energy to the plurality of particles. At least one temperature equilibrium substance is placed in the reaction space for balancing the temperature of the plurality of particles. The operating module is used to control the plurality of particles in the reaction space.

Further, the method for operating the acid amplification system described in the present disclosure mainly includes seven steps, comprising the steps of: step (a) mixing the sample and the plurality of particles, so that the plurality of particles captures the at least one analyte; step (b) using the operating module to concentrate the sample in the reaction space, wherein the sample includes the at least one analyte, and wherein step (e) immediately follows the step (b) if the at least one analyte is a cell-free nucleic acid, otherwise, proceed to step (c); step (c) in which the at least one energy supply module provides an external energy to the plurality of particles, so that a temperature of the plurality of particles rises to a thermolysis temperature; then proceed to step (d) at least one analyte will be lyzed, thereby releasing at least one biological substance; and followed by step (e) the at least one energy supply module provides the external energy to the plurality of particles up to a hybridization capture temperature, so that the particles is bound to the at least one biological substance or the cell-free nucleic acid; and step (f) providing the external energy to the plurality of particles up to an amplification temperature with the at least one energy supply module, and then using the enzyme to amplify the at least one biological substance or the cell-free nucleic acid on the particles, so that the amplicons generated from at least one biological substance or the cell-free nucleic acid that is tethered with the plurality of particles. In this reaction, at least one temperature equilibrium substance is used to cool down the plurality of particles, thereby maintaining the temperature range for isothermal amplification or achieving rapid temperature cycling.

In one embodiment of the method for performing the nucleic acid amplification system as described in the present disclosure, after step (f), further comprising step (g); wherein step (g), wherein a detection module is used to detect a colorimetric change, a luminescence or a combination thereof caused by the specific tags on the at least one biological substance or the cell-free nucleic acid that is amplified, so as to detect the at least one biological substance or the cell-free nucleic acid, which is amplified, on the plurality of particles that is concentrated. Using the detection module to analyze the difference of the fluorescence intensity, wherein the detection module is a fluorescence detection device (e.g., fluorometer or a fluorescent scanner) or a spectrophotometric detection device; or by using the specific binding DNA fragments or antibody-coupled enzyme reactions to detect the specific tags on the biological substance amplified by the polymerase.

The purpose of the brief description of the present disclosure mentioned above is to provide a basic description of several aspects and technical features of the present disclosure. The brief description is not a detailed description of the present disclosure. Therefore, the purpose of the description is not to specifically list the key components or important components of the present disclosure, nor to define the scope of the present disclosure, but to demonstrate several concepts of the present disclosure in a concise manner.

DETAILED DESCRIPTION OF THE PREFERRED EMBODIMENTS

Figure 1:
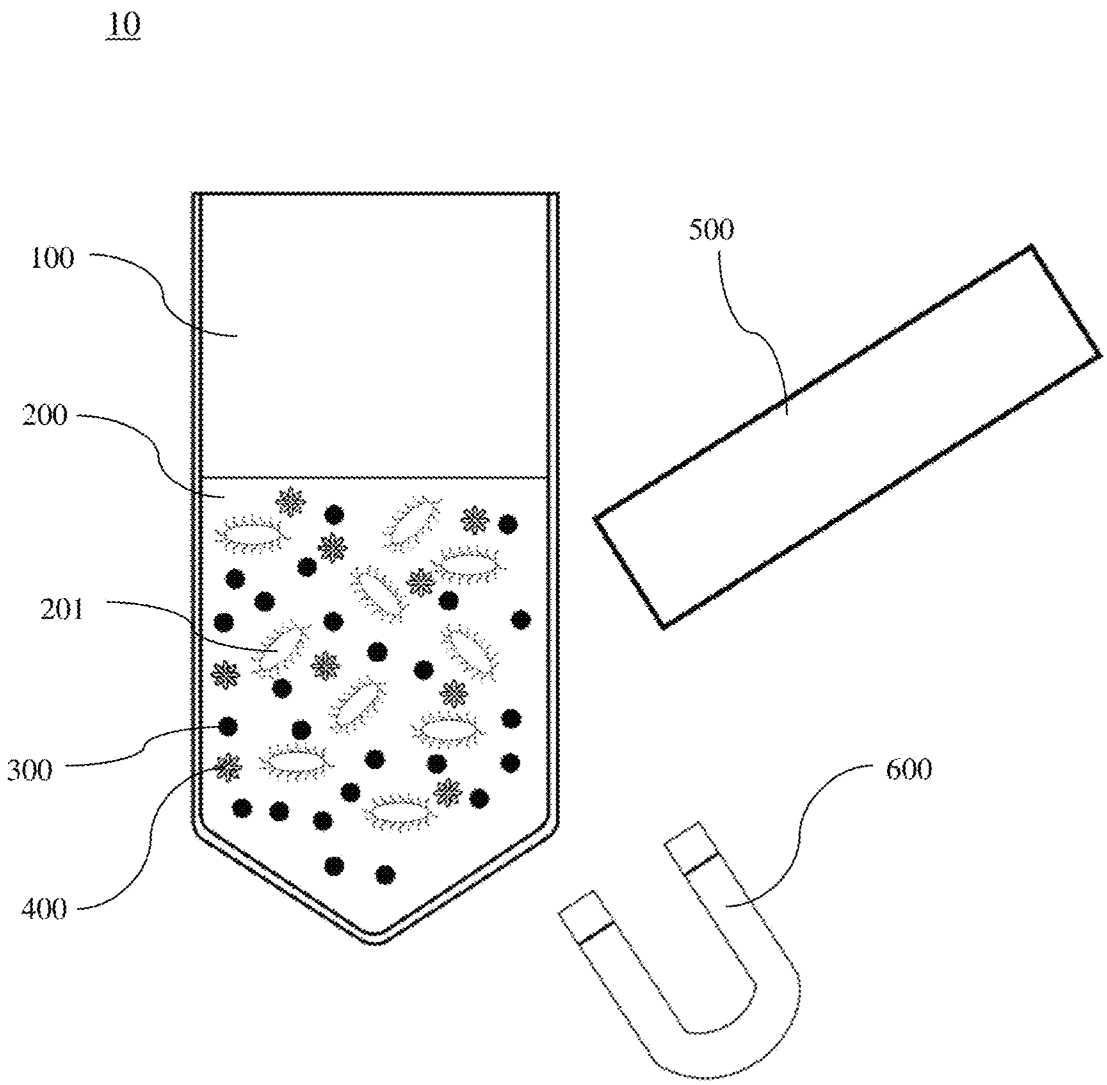
FIG. 1 is a schematic diagram of the structure of the nucleic acid amplification system in one embodiment of the present disclosure.

In order to illustrate the technical features and practical effects of the present disclosure, and to enable those having ordinary knowledge of the art of the present disclosure to carry out the implementation according to the content of the specification of the present disclosure, the preferred embodiment shown in the drawings is further described in detail.

First of all, referring to FIG. 1, FIG. 1 is a schematic diagram of the structure of the nucleic acid amplification system in one embodiment of the present disclosure. In one embodiment of the present disclosure provides a nucleic acid amplification system 10, comprising a reaction space 100, a sample 200, a plurality of particles, at least one enzyme, at least one energy supply module 500, and an operating module. The operating module is a magnetic component 600. Each of the plurality of particles is a magnetic nanoparticle 300. Each of the enzymes is polymerase 400.

In this embodiment, the sample 200, the plurality of particles, and the polymerase 400 are all placed in the reaction space 100, and the sample 200 in the reaction space 100 further comprises a temperature equilibrium substance. The temperature equilibrium substance comprises a large volume (greater than or equal to 100 μL) of nucleic acid amplification solution or an ice pack externally in contact with the reaction space. The ice pack comprises ice or high molecular polymer water-absorbent resin (i.e., carboxymethyl cellulose) with high specific heat capacity. The plurality of particles is the plurality of magnetic nanoparticles. The temperature of the microenvironment around the of particles is heated by magnetic nanoparticles 300 through photothermal reaction and is rapidly cooled down by the temperature equilibrium substance, therefore, it can maintain a constant temperature range for performing isothermal NAATs or achieve the ultrafast thermal cycling for PCR by controlling NIR laser irradiations and assistance of temperature equilibrium substance.

In this embodiment, the sample 200 includes at least one analyte 201 to be tested, and the sample 200 is placed in the reaction space 100. Specifically, the sample 200 referred to in this embodiment can be any biological fluids or its corresponding supernatants used for biological detection (e.g., serum, plasma, urine, lymph, throat swab, nasopharyngeal swab, bronchoalveolar lavage fluid, sputum, feces, cerebrospinal fluid, skin blister fluid, and scabs, or a combination thereof). Moreover, the sample 200 is pre-extracted samples of food or processed agricultural products, or a combination thereof. Furthermore, the sample 200 used in the present disclosure can be a purified sample or a sample without preliminary purification and pretreatment. Regardless of the conditions of the sample 200, the nucleic acid amplification system 10 shown in this embodiment can perform photothermal heating to lyze the analyte 201 to be tested. The analyte 201 is any individual microbes, tissues or cells. The analyte comprises at least one cell, at least one organelle, at least one bacterium, at least one algae, at least one protozoa, at least one fungus-like protist, at least one fungus, at least one virus, at least one phage, at least one cell-free nucleic acid, or a combination thereof, wherein the at least one cell-free nucleic acid further comprises at least one cell-free nucleic acid derived from body fluids, tumors or a combination thereof. The foregoing descriptions are examples only, and the present disclosure is not limited thereto.

Figure 2:
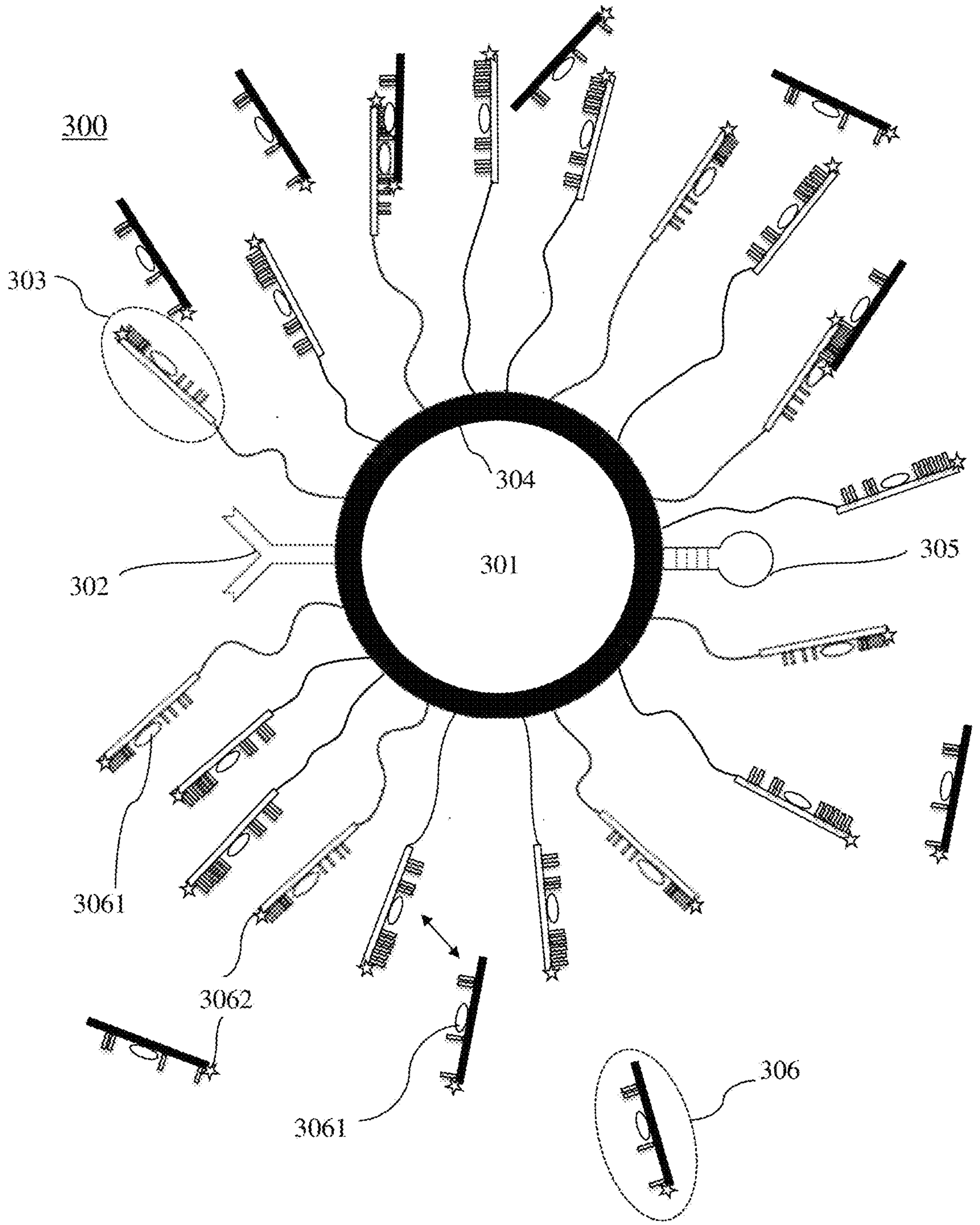
FIG. 2 is a schematic diagram of the structure of the magnetic nanoparticles in one embodiment of the present disclosure.

In this embodiment, the plurality of magnetic nanoparticles 300 is mixed with the sample 200. Referring to FIG. 2, FIG. 2 is a schematic diagram of the structure of the magnetic nanoparticles 300. The plurality of magnetic nanoparticles 300 can be selected as magnetic gold nanoshells (MGNs).

Referring to FIG. 2, in this embodiment, each magnetic nanoparticle 300 comprises a body 301, at least one first ligand 302, and at least one second ligand 303. In the present disclosure, the shape of the body 301 of the magnetic nanoparticle 300 is a sphere, a short rod, an anisotropic spike (such as a nanostar), a nanoshell, a nanocage, or a double triangular pyramid formed of metal or composite materials, but the shape of the body 301 not limited to the aforementioned shape. The material of the body 301 includes at least one precious metal such as gold, silver, palladium, platinum or a combination thereof. Since the discrete size and unique shape of nanoparticles are directly correlated with their plasmonic properties, (e.g., localized surface plasmon resonance; LSPR), and the converted heat energy (e.g. photothermal heating) is highly localized near the nanoparticles, the plasmonic photothermal effect can be used as an efficient heat source for controllable and uniform thermal release at a specific excitation wavelength. The form of at least one precious metal constructing the body 301 may be the above-mentioned noble metal coated or configured with at least one layer on the surface. In addition, the body 301 can further incorporate materials with near-infrared spectroscopy (NIR) absorption spectrum, (e.g., cyanine, polypyrrole, or graphene). The body 301 also comprises a group consisting of transition metals, transition metal oxides, their derivatives, or mixtures thereof. The transition metals such as iron or cobalt. The oxides of the aforementioned transition metals such as iron(II) oxide (FeO), iron(III) oxide ($Fe_2O_3$), iron(II) iron(III) oxide ($Fe_3O_4$), iron(III) oxide-hydroxide (FeO (OH)), iron(II) hydroxide ($Fe(OH)_2$), iron(III) oxide-hydroxide ($Fe(OH)_3$), cobalt(II) oxide (CoO), cobalt oxide (hydroxide) (CoO(OH)), Cobalt(II, III) oxide ($Co_3O_4$). The present disclosure is not limited thereto. As long as the body 301 can be made to comprise the properties of photothermal conversion or thermomagnetic conversion, or the body 301 can be further made to comprise magnetic properties and related technical means according to requirements within the scope of the present disclosure.

Referring to FIG. 2, in this embodiment, the at least one first ligand 302 functionalized on the surface of the body 301 comprises an antibody, an aptamer, an oligonucleotide or a combination thereof, but not limited thereto. The first ligand 302 match the at least one analyte 201 mentioned above. The at least one first ligand 302 specifically binds the analyte 201 to adsorb the surface of the sample 200 on the body 301. The at least one second ligand 303 is functionalized on the body 301. The second ligand 303 comprises an antibody, an aptamer, an oligonucleotide or a combination thereof, but not limited thereto. Each of the at least one second ligand 303 comprises a specific marker. The specific tag is a fluorescent group 3061 or a nucleic acid tag 3062. Furthermore, the second ligand 303 is a single-strand nucleic acid sequence. The second ligand 303 functionalizes on the surface of the body 301, it can capture the biological substances (e.g., nucleic acid) released from the analyte 201 lyzed after photothermal lysis for subsequent nucleic acid amplification. Therefore, the surface functionalization of each of the at least one magnetic nanoparticles 300 has modified at least two surface processing procedures, resulting in it can improve specificity for subsequent nucleic acid amplification and detection.

In this embodiment, the first ligand 302 and the second ligand 303 are specifically designed to analyze a trace analyte 201 in the sample 200. In this embodiment, each first ligand 302 and each second ligand 303 are connected to the body 301 through a stabilizing bond 304. The stabilizing bond 304 comprises a thermostable bond, a contact inhibition coating or a combination thereof. Moreover, the thermostable bond further comprises biotin-streptavidin interaction, the connection of a chemical cross-linker, or other covalent bonds with thermostable properties. Because the combination of streptavidin and biotin has extremely high thermal stability (>105° C.) at its saturated state, and its preparation method is simple. Therefore, the biotin-streptavidin interaction provides high-specificity and high-affinity characteristics on ligand modification, and a stable bonding can endure the high-temperature ranges during PCR cycle. In contrast, the prior art generally uses thiol-modified ligands to form a stable disulfide bond (—S—S) on gold nanoparticles, however, the appearance of dithiothreitol (DTT) or other reducing agents in the PCR reaction solution can lead to loss of thiol-modified ligand functionalization. In the presence of dithiothreitol (DTT) or other reducing agents, the stable disulfide bridge is easy to reduce to a sulfhydryl group (—SH status), causing the ligands to be detached from the surface of nanoparticles during the PCR procedure. In addition, the streptavidin forms a protein coating layer on the surface of the nanoparticles to reduce the non-specific adsorption of nanoparticles.

In this embodiment, the polymerase 400 is also mixed with sample 200. The polymerase 400 is deoxyribonucleic acid polymerase (DNA polymerase), ribonucleic acid polymerase (RNA polymerase), or a combination thereof. According to the type of nucleic acid to be detected or the type of the second ligand 303, the polymerase 400 can be replaced, which is not limited by the present disclosure. Moreover, the enzyme further includes reverse transcriptase (RT), ribonuclease (RNase), helicase, DNA ligase or a combination thereof, which can be used according to types of sample 200 or nucleic acid amplification reactions. The type of enzyme can be changed depending on the situation.

In addition, in this embodiment, in order to reduce the contact inhibition between the surface of the body 301 and DNA polymerase or RNA polymerase, the surface of the body 301 is modified with the contact inhibition coatings. The contact inhibition coating comprises silica coating, polyethylene glycol (PEG) or a combination thereof. The contact inhibition coating is used as a filling molecule on the surface of the body 301 to reduce aggregation between magnetic nanoparticles 300 and improve the stability of the surface of the magnetic nanoparticles 300.

In this embodiment, the at least one energy supply module 500 comprises a laser transmitter, a light-emitting diode or a magnetic field generator, thereby providing an external energy B to the plurality of magnetic nanoparticles 300. The types of external energy B comprise light energy or alternating magnetic fields (AMFs). In this embodiment, the external energy source B (refer to FIG. 7) is selected as laser light as an example. The operating module controls the plurality of magnetic nanoparticles 300 in the reaction space 100. Although the operating module is selected as magnetic component 600, in practice, the operating module is chosen further from the magnetic component 600, centrifuge or a combination thereof according to the types of the particles or the requirements of the subsequent detection steps. When the operating module is the magnetic component 600, the particles are magnetic nanoparticles 300, so that the magnetic component 600 can control the plurality of magnetic nanoparticles 300 in the reaction space 100, Furthermore, the magnetic component 600 can be a permanent magnet, an electromagnet or a combination thereof, which is not limited in the present disclosure. Furthermore, the magnetic component 600 comprises a permanent magnet, an electromagnet or a combination thereof, which is not specified in the present disclosure.

In the present disclosure, the nucleic acid amplification system 10 can further comprise a detection module that detects the specific tags in each of the at least one second ligand of the plurality of particles concentrated by the operating module. In one embodiment, the detection module is used to detect the fluorescence F generated from the fluorescent group 3061 on the at least one second ligand 303 of the plurality of magnetic nanoparticles 300 concentrated by the operating module. The biological substance 202 from the analyte 201 that is amplified on the surface of the plurality of magnetic nanoparticles 300 is quantified. In this embodiment, the biological substance 202 is DNA or RNA, but not limited thereto.

When the biological substance 202 is a nucleic acid, in-situ polymerase chain reaction (in-situ PCR), reverse transcription or isothermal amplification will be used for nucleic acid amplification. Isothermal amplification refers to nucleic acid amplification technology with an operating temperature greater than 37° C. Isothermal amplification technology comprises loop-mediated isothermal amplification (LAMP), strand displacement amplification (SDA), Helicase-dependent amplification (HDA), nucleic acid sequence-based amplification (NASBA), and transcription-mediated amplification (TMA), nicking enzyme amplification reaction (NEAR), recombinase polymerase amplification (RPA).

Amplification of nucleic acid, that is, after the analyte 201 is lyzed and releases the biological substance 202, and then the biological substance 202 is amplified through the nucleic acid amplification, which is called the amplicon.

Figure 3:
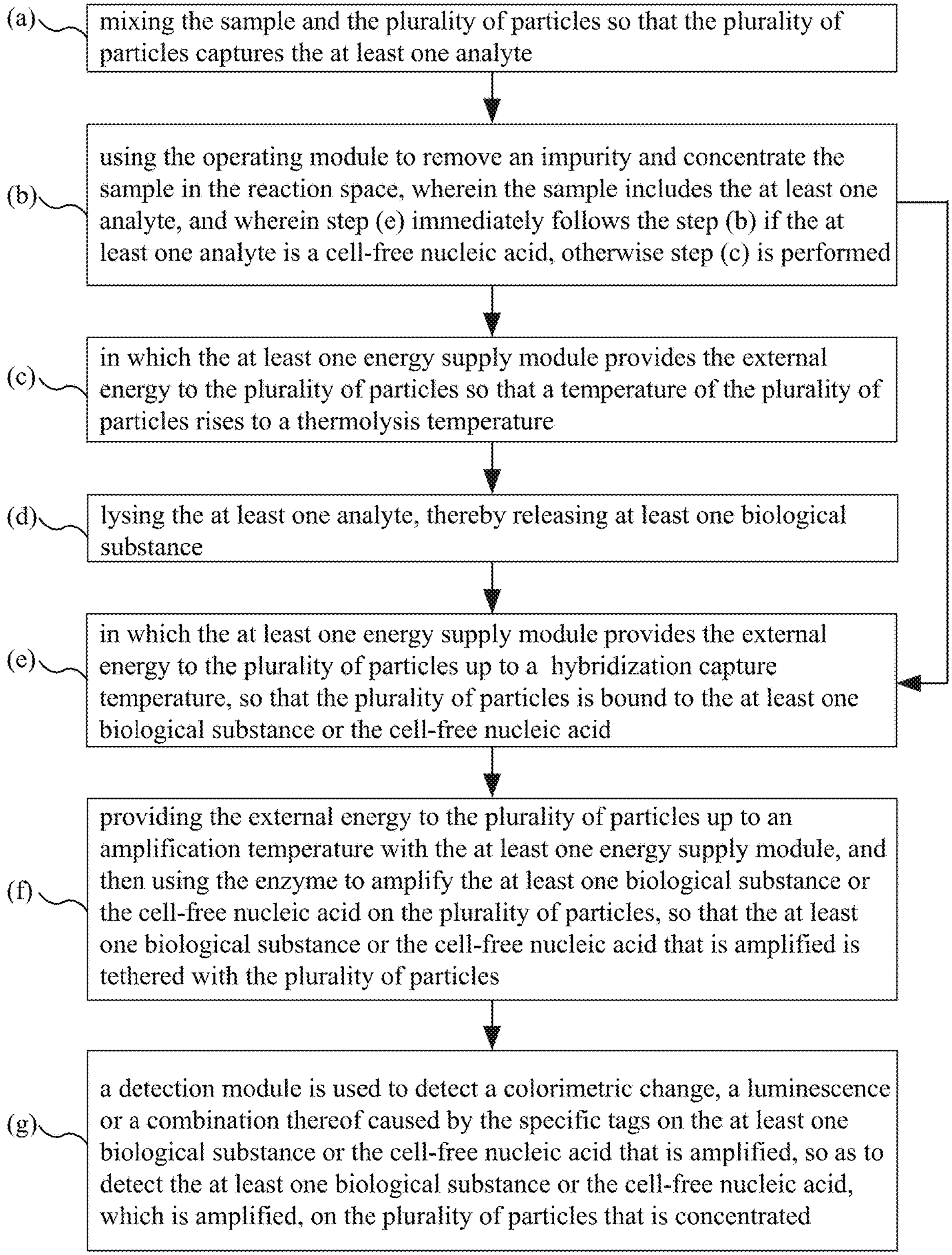
FIG. 3 is a flow chart of the method for performing the acid amplification system in one embodiment of the present disclosure.

Referring to FIG. 3, FIG. 3 is a flow chart of the method for operating the nucleic acid amplification system 10. In this embodiment, the method for operating the acid amplification system described in the present disclosure mainly includes seven steps, comprising the step (a) mixing the sample 200 and the plurality of magnetic nanoparticles 300, so that the plurality of magnetic nanoparticles 300 captures the at least one analyte 201; step (b) using the operating module and concentrating the sample 200 in the reaction space 100, wherein the sample includes the at least one analyte 201, and wherein if the at least one analyte 201 is a cell-free nucleic acid, then directly enter the step (e), if otherwise perform step (c).

Step (c) in which at least one energy supply module 500 provides the external energy to the plurality of magnetic nanoparticles 300, so that a temperature of the plurality of magnetic nanoparticles 300 rises to a thermolysis temperature; step (d) the at least one analyte 201 is lyzed, thereby releasing at least one biological substance 202; step (e) in which the at least one energy supply module 500 provides the external energy B to the plurality of magnetic nanoparticles 300 up to a hybridization capture temperature, so that the second ligands 306 of the plurality of magnetic nanoparticles 300 are bound to the at least one biological substance 202 or the cell-free nucleic acid through the operating module; and step (f) providing the external energy B to the plurality of magnetic nanoparticles 300 up to an amplification temperature with the at least one energy supply module 500, and then using the polymerase 400 to amplify the at least one biological substance 202 or the cell-free nucleic acid on the plurality of magnetic nanoparticles 300; step (g) after concentration with the operating module, the signal readouts of amplicons on the plurality of particles are measured with a detection module to through a colorimetric change, a luminescence or a combination thereof generated by the specific tags in the at least one biological substance 202 or the cell-free nucleic acid.

Figure 4:
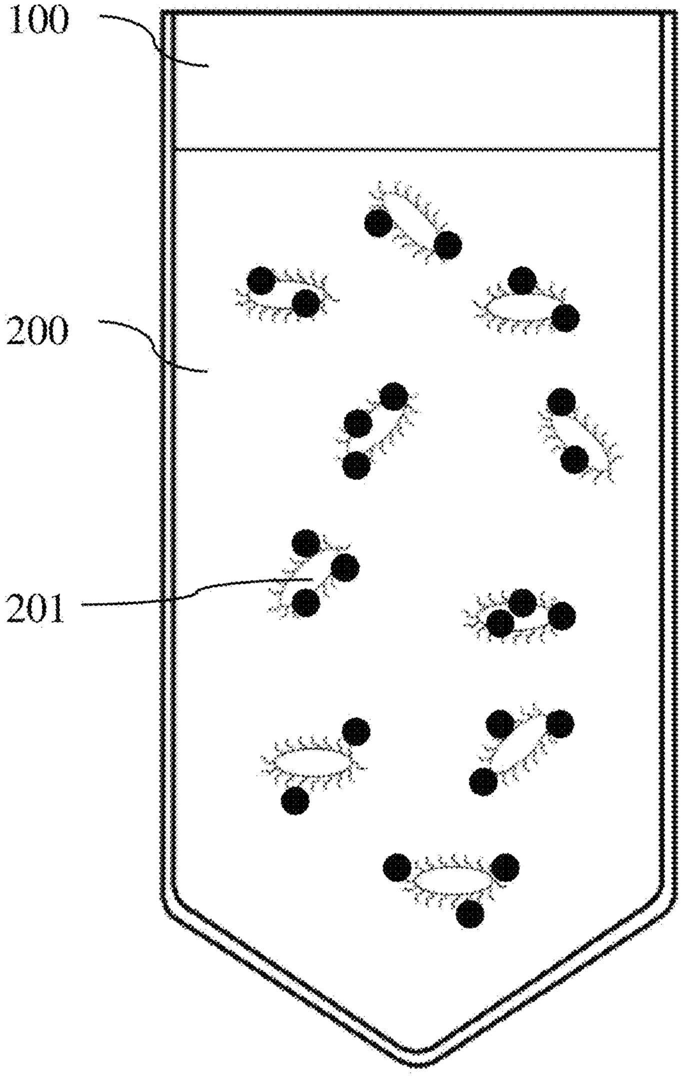
FIG. 4 is a schematic diagram of the sample before being concentrated in one embodiment of the present disclosure.
Figure 5:
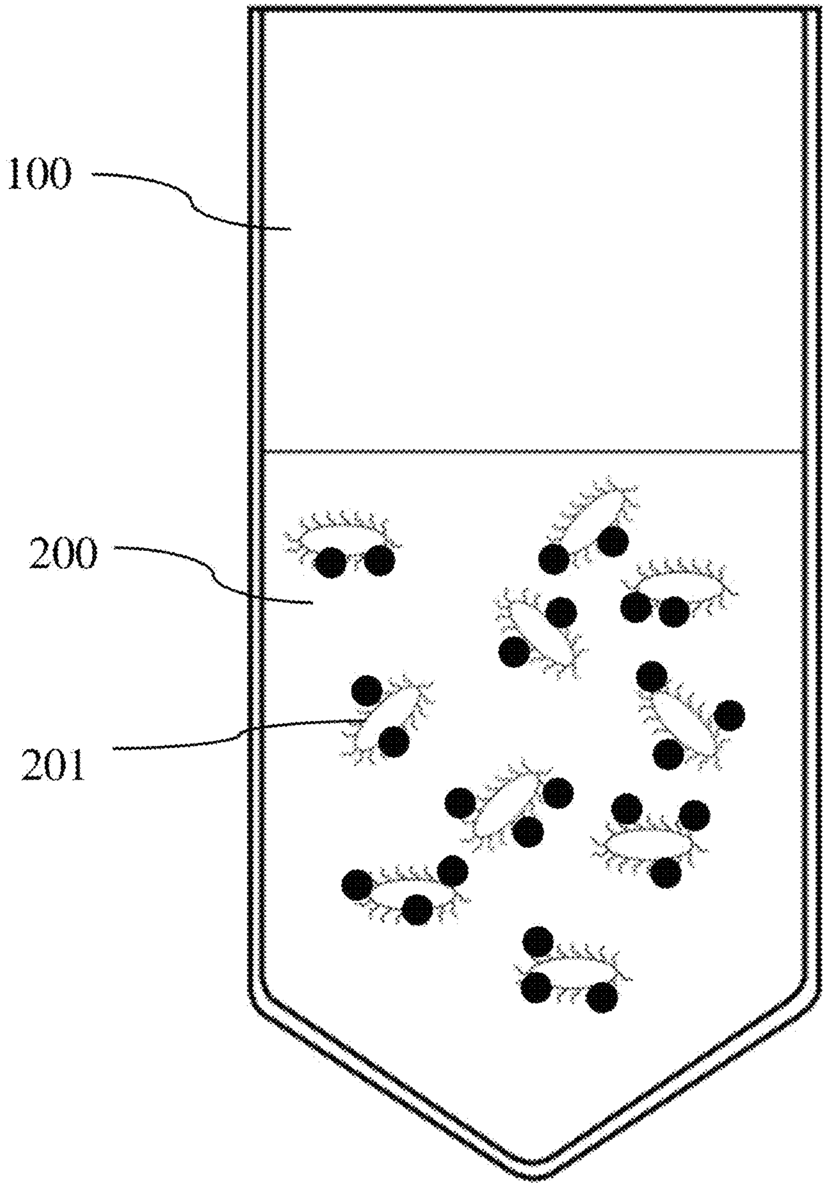
FIG. 5 is a schematic diagram of the sample after being concentrated in one embodiment of the present disclosure.

In order to more clearly illustrate the method of the nucleic acid amplification system 10 described in this embodiment, please refer to FIG. 3 to FIG. 5. FIG. 4 is a schematic diagram of the sample before being concentrated in one embodiment of the present disclosure. FIG. 5 is a schematic diagram of the sample after being concentrated in one embodiment of the present disclosure.

Referring to FIG. 3, in this embodiment, step (a) is to mix the sample 200 with the plurality of magnetic nanoparticles 300 so that the plurality of magnetic nanoparticles 300 capture at least one analyte 201. The analyte 201 comprises at least one cell, at least one bacterium, at least one alga, at least one protozoa, at least one fungus-like protist, at least one fungus, at least one virus, at least one phage, or a combination thereof. Basically, the analyte 201 must have an antigen that can be recognized and captured by a specific antibody, and carry genetic related substances (e.g., nucleic acid), so that it can be detected in this embodiment. Referring to FIG. 2, the specific antibody 302 or aptamer 305 capable of recognizing the antigen of the analyte 201 is functionalized on the surface of magnetic nanoparticles 300. The analyte 201 is capable of being captured by the plurality of the magnetic nanoparticles 300, and undergoes thermolysis of the analyte 201 and the biological substance 202 (e.g., nucleic acid) released from the analyte 201.

Referring to FIG. 3 to FIG. 5. FIG. 4 is a schematic diagram of the sample before being concentrated in one embodiment of the present disclosure. In this embodiment, in order to accelerate the procedure of detection, in step (b), the operating module is used in the reaction space 100 to concentrate the sample 200, and the impurity of sample 200 is removed through washing procedures, as shown in FIG. 5. After the sample 200 is further concentrated, it contains at least one analyte 201. The operating module comprises a magnetic component, a centrifuge, or a combination thereof. The concentration method in this embodiment includes centrifugation to remove the supernatant, or using the magnetic component 600 to concentrate the plurality of magnetic nanoparticles 300 through magnetic separation or a combination thereof, which is not limited in the present disclosure. The impurity is a non-target analyte mixture, including putative inhibitors for subsequent nucleic acid amplification originating from sample 200. The analyte 201 is captured by first ligand 302-functionalized magnetic nanoparticles 300, and concentrated by the operating module through a magnetic separation procedure.

Figure 6:
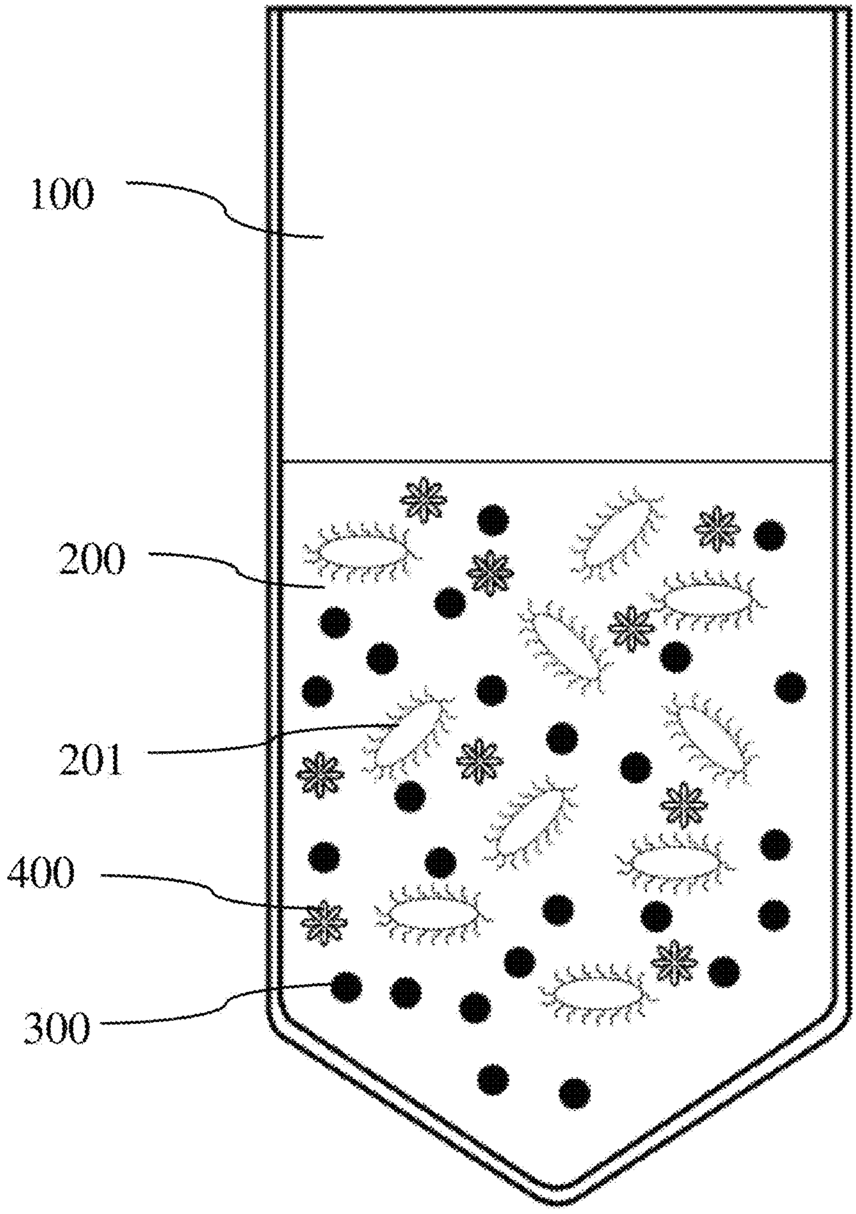
FIG. 6 is a schematic diagram of the addition of at least one enzyme in one embodiment of the present disclosure.
Figure 7:
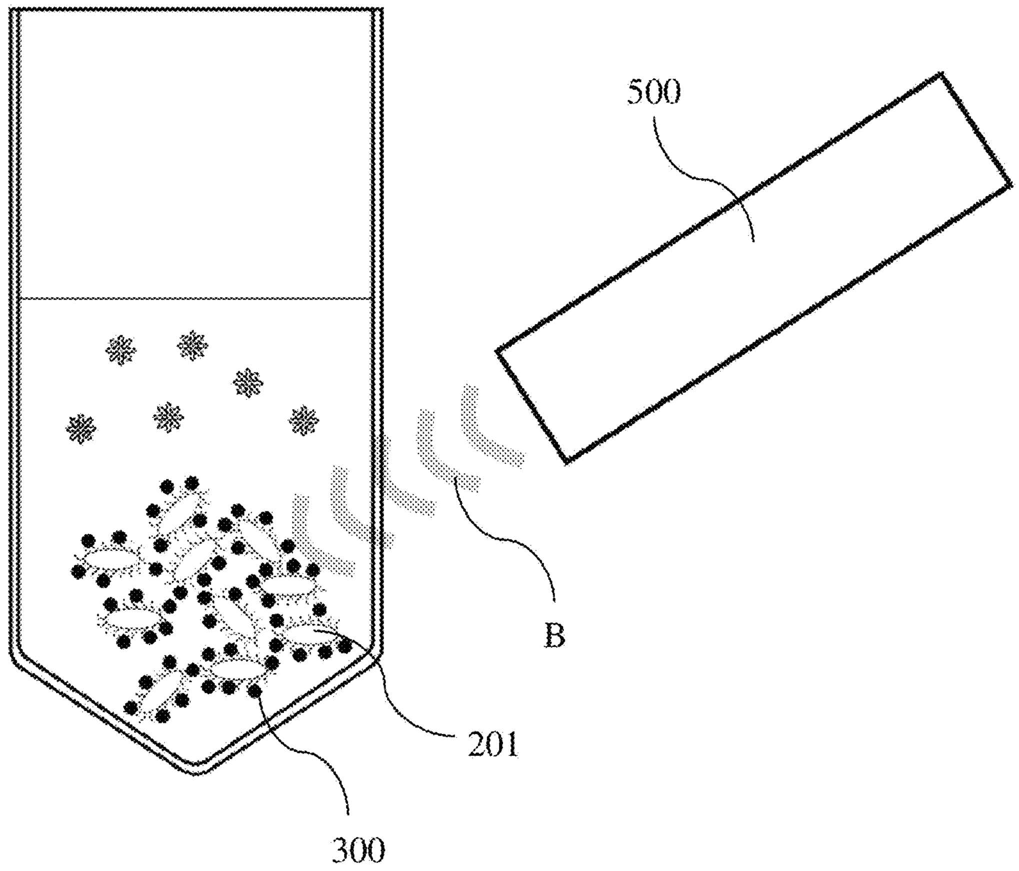
FIG. 7 is a schematic diagram of the at least one analyte being lyzed in one embodiment of the present disclosure.

Referring to FIG. 3, FIG. 6 and FIG. 7. FIG. 6 is a schematic diagram of the addition of at least one enzyme in one embodiment of the present disclosure. FIG. 7 is a schematic diagram of the at least one analyte being lyzed in one embodiment of the present disclosure. As shown in Step (c) of FIG. 3 corresponding to FIG. 6-7. Referring to FIG. 6, in this embodiment, in step (c), a polymerase 400 can be further added in step (c). In other embodiments, if the thermolysis temperature of step (c) will affect the polymerase 400 and cause it to lose the activity, the polymerase 400 can also be added in step (f), which is not limited by the present disclosure.

In FIG. 7, at least one first ligand 302 or at least one aptamer 305 (referring to FIG. 2) functionalized modification enables the magnetic nanoparticles 300 to recognize the antigen of the analyte 201, thereby rapidly capturing the analyte 201 in the sample 200. In this embodiment, the analyte 201 includes microbes or specific cell types. In step (c), the energy supply module 500 provides the external energy B to the plurality of magnetic nanoparticles 300 to rise the temperature to the thermolysis temperature. As shown in FIG. 7. The transfer of external energy B is denoted as gray ripples between the magnetic nanoparticles 300 and the energy supply module 500.

The energy supply module 500 of the above-mentioned embodiment is a laser transmitter, and the type of external energy B is laser light. However, depending on the chemical material properties and physical size and shape of the body 301, different types of energy supply module 500 must be chosen. The function of energy supply module 500 mainly provides an energy transfer capable of heating the body 301.

The laser wavelength ranges mainly from the visible light spectrum to the near-infrared light spectrum (380 nm-1.4 μm), preferably, the laser wavelength is in the near-infrared spectrum region (750 nm-1.4 μm). The magnetic nanoparticles 300 convert the external energy B into thermal energy. The external energy B can be light energy, alternating magnetic field and other energy sources, which are not limited in the present disclosure. In this embodiment, the energy supply module 500 mainly heats the magnetic nanoparticles 300 itself and the microenvironment. The distance of the microenvironment is in micrometers (μm) around the magnetic nanoparticles 300, so it is more suitable for in-situ polymerase chain reaction (in-situ PCR).

Figure 8:
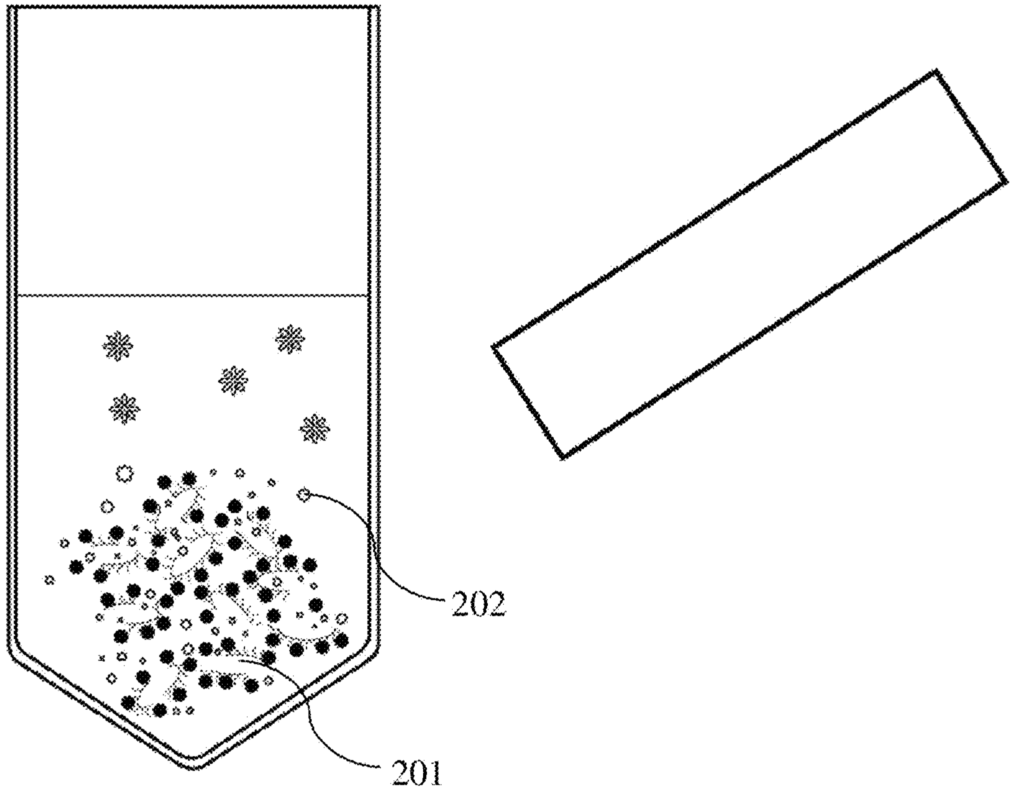
FIG. 8 is a schematic diagram of the at least one biological substance released by the at least one analyte in one embodiment of the present disclosure.
Figure 9:
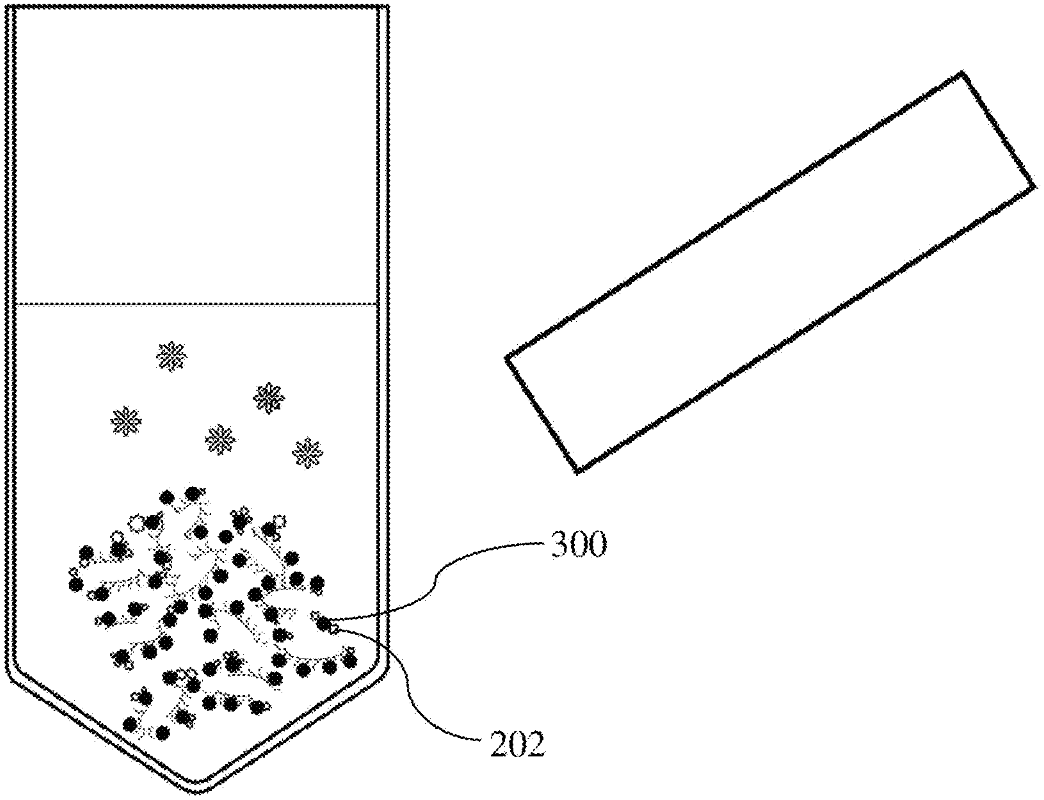
FIG. 9 is a schematic diagram of the at least one biological substance that is amplified being captured by the plurality of particles in one embodiment of the present disclosure.

Referring to FIG. 3, FIG. 8 and FIG. 9, simultaneously. FIG. 8 is a schematic diagram of the at least one biological substance 202 released from the at least one analyte 201 in the embodiment of the present disclosure. FIG. 9 is a schematic diagram of the at least one biological substance 202 that is amplified being captured by the plurality of particles in one embodiment of the present disclosure. FIG. 8 corresponds to step (d) of FIG. 3. In this embodiment, since the plurality of magnetic nanoparticles 300 have captured the analyte 201 through at least one first ligand 302 in step (c), thus making those close enough to be susceptible to subsequent photothermal heating. The magnetic nanoparticles 300 absorb the external energy B provided by the energy supply module 500, and then convert the external energy B into heat through the photothermal effect of the body 301. When the temperature of plurality of magnetic nanoparticles 300 rises to the thermolysis temperature, the outer structures of analyte 201 will be further lyzed, (e.g., cell membrane, cell wall, but not limited thereto). Therefore, the at least one analyte 201 completes lyses and releases at least one biological substance 202 after step (d).

In this embodiment, the biological substance 202 is DNA or RNA. Referring to FIG. 2, since the analyte 201 lyses in a state where the magnetic nanoparticle 300 and the analyte 201 are incredibly close, the released biological substance 202 from the analyte 201 will also exist in a high concentration around the magnetic nanoparticles 300. Referring to FIG. 3, as described in the step (e), the plurality of magnetic nanoparticles 300 capture at least one biological substance 202, as shown in FIG. 9. If the at least one analyte is a cell-free nucleic acid, then directly proceed step (e) after step (b). In step (e), the at least one energy supply module 500 provides an external energy B to the plurality of magnetic nanoparticles 300 up to a hybridization capture temperature, so that the plurality of magnetic nanoparticles 300 can capture the cell-free nucleic acids through the second ligand 303 (as shown in FIG. 2.)

In this embodiment, since the biological substance 202 is DNA or RNA, the second ligand 303 is correspondingly selected as a short strand of DNA or RNA or its modified derivatives complementary to the biological substance 202, so that to bind with at least one biological substance 202.

Figure 10:
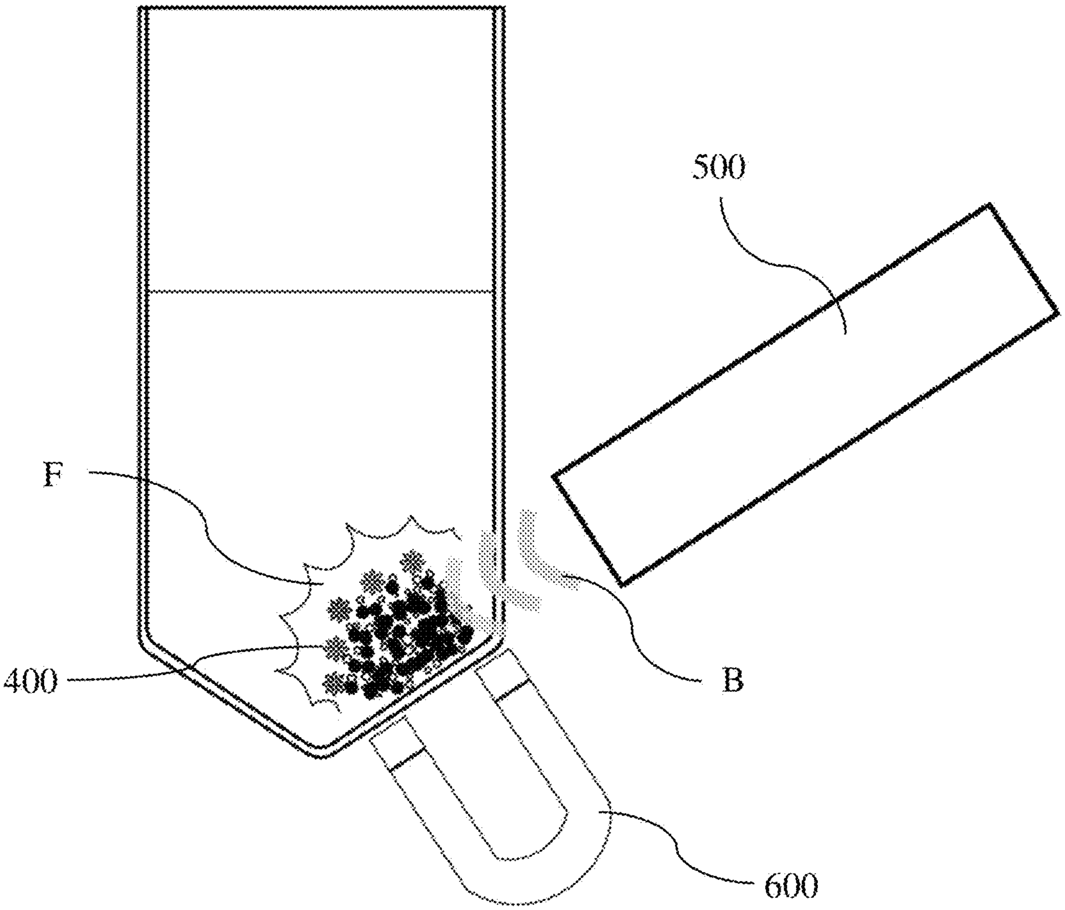
FIG. 10 is a schematic diagram of detection in one embodiment of the present disclosure.

Referring to FIG. 3 and FIG. 10, simultaneously. FIG. 10 is a schematic diagram of fluorescent F detection in one embodiment of the present disclosure. As shown in FIG. 10, corresponding to the steps (e)-(f) of FIG. 3. In step (e), when the plurality of magnetic nanoparticles 300 capture the at least one biological substance 202, then as shown in FIG. the plurality of magnetic nanoparticles 300 are concentrated by the magnetic component 600.

In step (F), the energy supply module 500 provides external energy B to the plurality of magnetic nanoparticles 300 in the reaction space 100 until the plurality of magnetic nanoparticles 300 reaches an amplification temperature for nucleic acid amplification. And then, the captured biological substance 202 on magnetic nanoparticles 300 will be used as a template for performing nucleic acid amplification with the polymerase 400. During the DNA amplification, the specific nucleic acid tags (e.g., fluorescent group 3061 or nucleic acid tag 3062) incorporate into amplicons, resulting in the signal readout changes of fluorescence intensity and colorimetric changes caused by fluorescent group 3061 and the nucleic acid tag 3062 coupling antibodies or enzymes. In this embodiment, the temperature equilibrium substance is a large volume (greater than or equal to 100 μL) of the PCR reaction solution. Since the temperature equilibrium substance has large heat capacity, it can quickly cool down the plurality of magnetic nanoparticles 300, so that the ultrafast thermal cycling is achieved to perform nucleic acid amplification.

In this embodiment, if the polymerase 400 has been added during the step (b), the polymerase 400 is selected as DNA polymerase, RNA polymerase, or reverse transcriptase according to the type of at least one biological substance 202, so that the nucleic acid amplification in the step (f) can be performed. It is also possible to add polymerase 400 during steps (e) to step (f). The addition time of polymerase 400 is not limited in the present disclosure.

Compared with the prior art, since the photonic in-situ PCR is performed on the surface of magnetic nanoparticles 300. Therefore, the amplicons are mostly present on the magnetic nanoparticles 300 through second ligand 303. Since the carrying capacity of the surface of the plurality of magnetic nanoparticle 300 is far less than the carrying capacity of the reaction space 100, the single strand amplicons and amplicons are present in a very small amount in the reaction space 100. Moreover, the limited carrying capacity of amplicons on magnetic nanoparticles 300 means that those can reach amplicon saturation at a relatively small nucleic acid amplification cycle.

Finally, step (g) is carried out through a detection device, in this embodiment, it can be a fluorometer or a fluorescent scanner to analyze the differences in the fluorescent intensity. In addition, the detection device can also be a spectrophotometric detection device, which is used to detect the colorimetric changes caused by the combination of nucleic acid tag 3062 or antibody-coupled enzyme reactions. The nucleic acid tag 3062 can be recognized by a specific antibody, and then the enzyme coupling on the antibody will convert colorless substrates into products with a specific color. Therefore, the colorimetric changes are analyzed by using the colorimetric method to detect the biological substance 202 that is amplified by the polymerase 400.

The intensity changes of fluorescence F or colorimetric changes caused by nucleic acid tag 3062 incorporation in amplicons can be referred to FIG. 2. In this embodiment, the free nucleic acid primer 306 includes the modifications of fluorescent group 3061 or a nucleic acid tag 3062. In other words, at least one biological substance 202 is released from at least one analyte 201, or the cell-free nucleic acid can be captured by second ligand 303 functionalized on magnetic nanoparticles 300 in the sample 200. The second ligand 303 has a complementary sequence to the corresponding target gene of the biological substance 202 or cell-free nucleic acid, and the captured biological substance 202 or cell-free nucleic acids are used as DNA templates to react with free nucleic acid primer 306 and the polymerase 400, resulting in the modifications of fluorescent group 3061 or a nucleic acid tag 3062 are incorporated into amplicons. Conversely, if the sample 200 does not contain analyte 201 or free nucleic acid substance, it means that no target gene can be recognized by the second ligand 303 on magnetic nanoparticles 300, and no amplicons are generated with the polymerase 400, so there are no changes in the intensity of fluorescence F or colorimetric detection.

As mentioned above, there are several embodiments for signal detection of amplicons with fluorescence F incorporation on the magnetic nanoparticles 300 and are not limited thereto. The fluorescence detection method and the primer labeled with the fluorescent group 3061 are utilized In one of the preferred embodiments. In this embodiment, the fluorescent group 3061 can be selected from fluorescein isothiocyanate (FITC). In this embodiment, a pair of free nucleic acid primer 306 (F3 primer and B3 primer) are provided to specifically bind to the malB gene of *E. coli*. Among them, the F3 primer has extra modifications (e.g., biotin or amine and $T_{20}$-$PEG_6$ spacer at the 5' end and internal sequence) for binding to the magnetic particles 300 through streptavidin-biotin interaction or covalent bond formation (e.g., cross-linking between a carboxylic group and an amine group), respectively. The biotin or amine-modified F3 primer at the 5' end can form a stable bridge with the bodys 301 through streptavidin-biotin interaction or covalent bond formation. The 5'-terminal of the B3 primer is labeled with FITC to form a FITC-B3 primer. The fluorescent group 3061 and the free nucleic acid primer 306 can be selected according to different detection requirements. The present disclosure is not limited thereto.

In summary, based on the aforementioned description, in this embodiment, the photonic in-situ PCR is performed, and the amplicons labeled with fluorescent groups 3061 are generated on the surface of magnetic nanoparticle 300, as for the free FITC-labeled B3 primer can be removed through the procedures of magnetic separation and washing. The amplicons labeled with FITC on the magnetic nanoparticle 300 can be further concentrated by magnetic force (or combined with centrifugal means), and the signal of fluorescent F on the surface of the magnetic nanoparticle 300 will also be enhanced for further fluorescence intensity detection. Owing to the size of the amplicon (e.g., about 100 bp/30 nm) on the magnetic nanoparticle 300, The amplicon forms an appropriate spacer between fluorescent group 3061 and the surface of the magnetic nanoparticle 300, allowing fluorescence intensity of the fluorescent group 3061 enhanced through metal-enhanced fluorescence (MEF) effect. The fluorescent F intensity of amplicons can be analyzed by the fluorescence scanner or fluorescence spectrometry.

In one embodiment, we use a lateral flow dipstick to detect the amplicons labeled with the fluorescent group 3061 or a nucleic acid tag 3062 on the magnetic nanoparticles 300. The detection method is slightly different from the conventional gold nanoparticle-based lateral flow immunoassay. The conventional lateral flow test used specific antibody-functionalized gold nanoparticles as detection particles with unique optical properties. However, in this embodiment, specific antibody-functionalized gold are not used in the lateral flow dipstick, instead, magnetic nanoparticles 300 are used as optical makers in the lateral flow dipstick, and the capture antibodies specific against fluorescent group 3061 or nucleic acid tag 3062 are used, those are dispersed and immobilized on the region of detection line of test membrane. When the liquid samples containing the target amplicons labeled with fluorescent group 3061 or nucleic acid tag 3062 on the surface of magnetic nanoparticles 300, with liquid samples migrate along the strip into the detection zone, the target amplicons will be immobilized on the test line to generate an optical signal; while the control line will only immobilize the first ligand 302 which recognizes the magnetic nanoparticle 300 itself.

In addition to the above-mentioned embodiment of detecting fluorescence F signal, there are further other detection methods, comprising bead-based ELISA, litmus test, and other methods, which are not limited thereto. The bead-based ELISA is to improve the sensitivity of the detection method or to convert the fluorescence F signal into the detection signal for detection by colorimetric method. The antibody coupled with enzyme is used in bead-based ELISA, and the antibodies include that those can specifically recognize the fluorescent group 3061 (e.g., FITC) or nucleic acid tags (e.g., digoxigenin, biotin) labeled in amplicons, and the coupled enzymes include horseradish peroxidase (HRP) and alkaline phosphatase (AP). The substrates for HRP are included 3,3',5,5'-tetramethylbenzidine (TMB), (2,2'-Azinobis [3-ethylbenzothiazoline-6-sulfonic acid]-diammonium salt (ABTS), and o-phenylenediamine dihydrochloride (OPD). The substrates for AP are included p-Nitrophenyl Phosphate (PNPP), those colorless substrates are converted into products with specific colors by HRP or AP. In this embodiment, the bead-based ELISA uses anti-FITC-coupled with HRP and TMB substrates for performing colorimetric detection at $A_{450nm}$.

The Litmus test has a similar working principle to the aforementioned bead-based ELISA. However, the litmus test does not use antibodies for specific amplicon detection. In the Litmus test, the modified primers are used to perform the photonic in-situ PCR, the reverse primer contains a target binding sequence and an extra sequence (i.e., UrD binding tag) that is designed to hybridize with the DNA strand coupled onto urease (i.e., UrD). The amplicons labeled with UrD binding tag on the magnetic nanoparticles can be recognized with the UrD. The urease of UrD catalyzes the hydrolysis of urea into ammonia, resulting in the increase of the pH value in the reaction solution. The pH value change of the reaction solution can be further detected by an acid-base indicator (e.g., phenol red, cresol red, or cresol purple), especially the acid-base indocator within pH7 to pH9, the readout of the amounts of amplicons on the magnetic nanoparticles 300 can be converted to colorimetric change for detection.

Based on the above-mentioned descriptions, the embodiments of the present disclosure not only overcome multiple limitations (e.g., removal of inhibitors originating from biological samples, concentration procedure for trace target analytes, sample 200 pretreatment in a single reaction space 100), but also enable the magnetic nanoparticles 300 to have capabilities, (e.g, specific capture ability of the analyte 201 and biological substance 202, photothermal conversion ability, and magnetic properties). Therefore, the magnetic nanoparticle 300 simultaneously functions as a heater and a carrier, so that it can rapidly and visually identify whether the analyte 201 exists in the sample 200. In addition, by controlling the NIR laser modulations and the temperature equilibrium substance in the sample 200, the constant temperature for photonic in-situ LAMP or ultrafast thermal cycling for photonic in-situ PCR can be achieved within a short turnaround time, which solves the time-consuming issue of molecular diagnostics.

The following content will be described with experimental results, including FIG. 11 to FIG. 23, to illustrate the scope of the present disclosure more clearly.

Referring to FIG. 1 to FIG. 10, in one embodiment of the present disclosure, the magnetic nanoparticles 300 are selected from magnetic gold nanoshells (MGNs) to performing photothermal converted temperature experiments.

Figure 11:
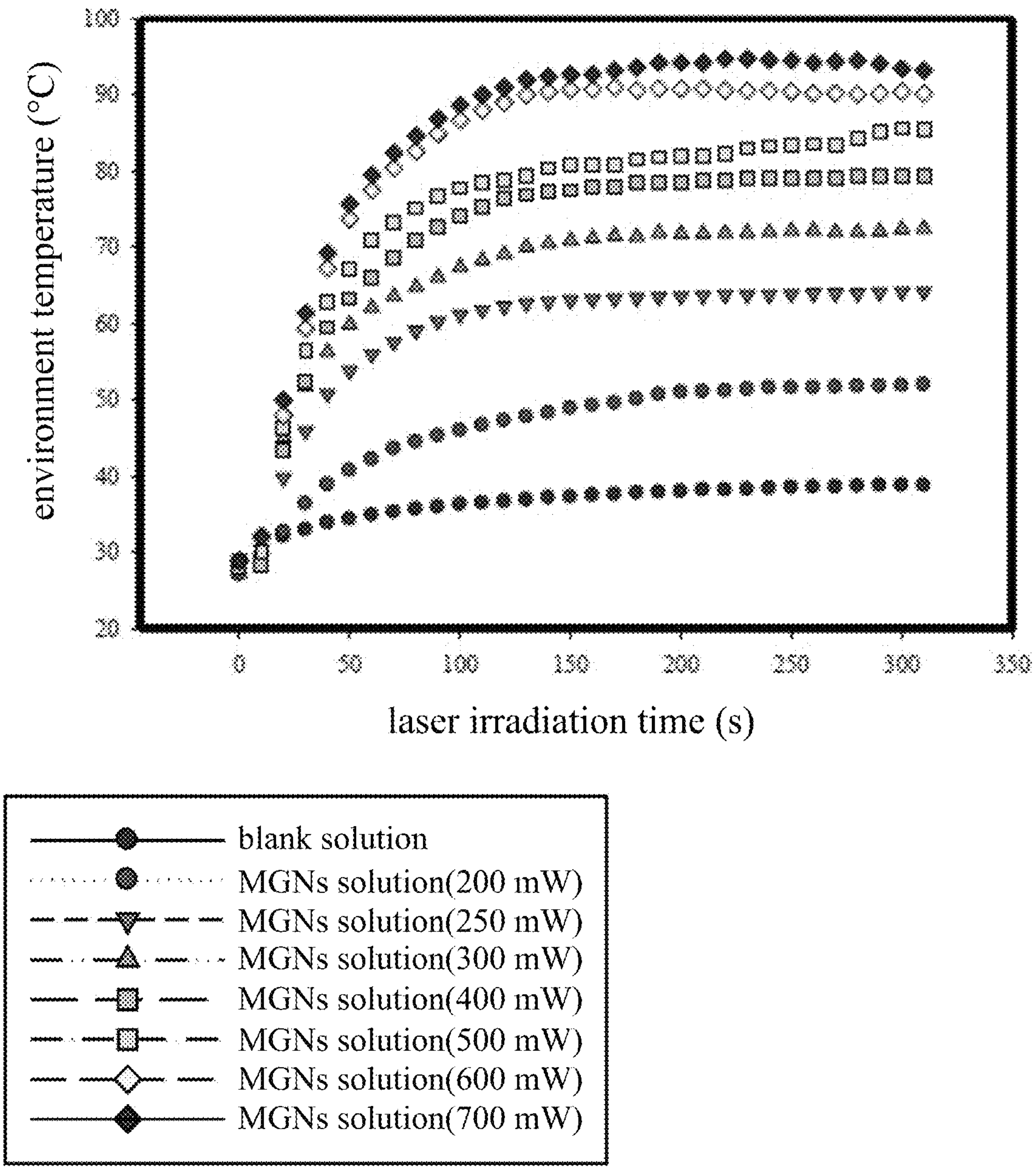
FIG. 11 shows that the photothermal heating curve at a steady status of magnetic gold nanoshells (MGNs under 808 nm laser irradiations with various power (from 200 mW to 700 mW is shown in one embodiment of the present disclosure.

As shown in FIG. 11, The photothermal heating curve of magnetic gold nanoshells (MGNs; $2.9\times10^{10}$ particles/mL) under 808 nm laser irradiations with various power (from 200 mW to 700 mW) at a steady status. The energy supply module 500, including various laser settings (e.g., laser power outputs, the sequential on/off procedure and time of NIR laser irradiation) are controlled via LabVIEW software by a laptop, the NIR laser at 808 nm acts as the external energy B to MGNs with a manner. The photothermal converted heating of MGNs is further evaluated with different powers (200 mW to 700 mW) and the photothermal temperature at a steady status.

Figure 12:
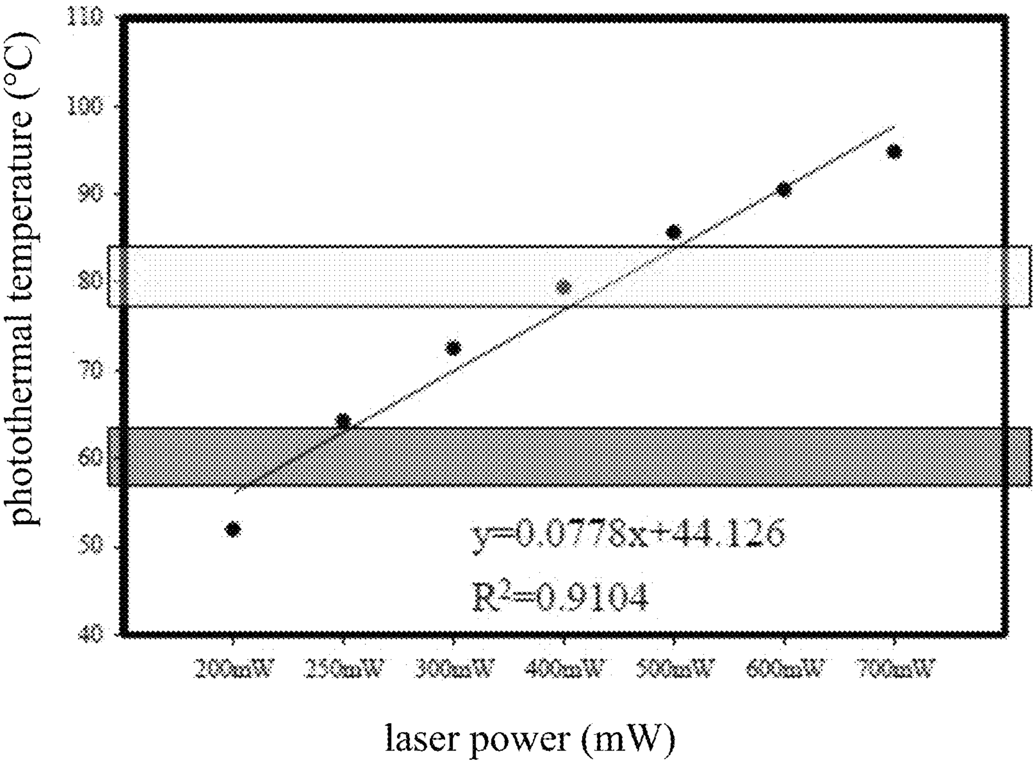
FIG. 12 shows that calibration curves of laser power and the temperature of photothermal heating at steady status (TPT(ss)) of the MGNs. The magnetic nanoparticles are selected as magnetic gold nanoshells (MGNs) in one embodiment of the present disclosure.
Figure 13:
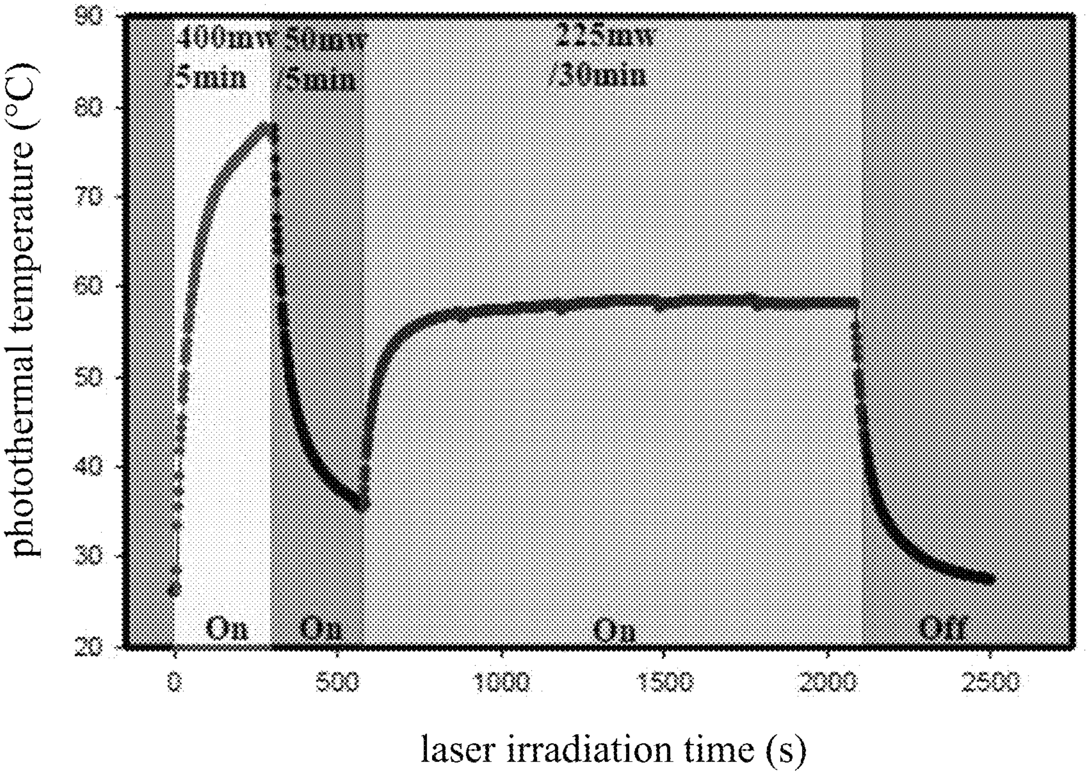
FIG. 13 shows that the actual photothermal temperature monitoring of MGNs for photothermal lysis, DNA hybridization capture, and LAMP (loop-mediated isothermal amplification) implementations under various 808 nm laser irradiations was obtained from the abovementioned calibration curve. The MGNs solution was used to perform photothermal lysis reaction and LAMP in one embodiment of the present disclosure.

Referring to FIG. 12, calibration curves of laser power and the ambient temperature of the MGNs. In this embodiment, the surrounding temperature of MGNs are heated through the photothermal effect with an 808 nm laser for 300 seconds (i.e. the photothermal temperature around the MGNs rises to a steady state), and a k-type thermocouple or infrared thermography is used to monitor the photothermal temperature changes during the entire heating process. As shown in FIG. 12, it reveals that the photothermal converted temperature at a steady status has a linear relationship with the laser energy intensity of the external energy source. The gray and dark gray areas indicate the temperature windows suitable for photothermal lysis of target analyte 201 (temperature range 80 to 85° C.), and LAMP manipulation (60 to 65° C.), respectively. As shown in FIG. 13, the manipulations of 808 nm laser including various laser settings (e.g., laser power outputs, the sequential on/off procedure, and time of NIR laser irradiation) are controlled via LabVIEW software by a laptop. The actual photothermal temperature monitoring of MGNs for photothermal lysis, DNA hybridization capture, and LAMP (loop-mediated isothermal amplification) implementations under various 808 nm laser irradiations was obtained from the abovementioned calibration curve. The MGNs solution ($2.9\times10^{10}$ particles/mL) was used to perform photothermal lysis reaction and LAMP in one embodiment of the present disclosure.

Referring to FIG. 13, in this embodiment of photonic in-situ LAMP implementation, firstly, the magnetic nanoparticles 300 (e.g., MGNs) are irradiated with the 808 nm laser with the power of 300 mW to 700 mW to perform photothermal lysis for min. Next, the magnetic nanoparticles 300 are irradiated with a laser with a power of 10 mW to 50 mW, so that the reaction temperature generated by MGNs can be slowly cooled down, resulting in the biological substance 202 can be recognized and captured by the second ligand 303-functionalized MGNs. Finally, the MGNs are irradiated with an 808 nm laser with a power of 200 mW to 250 mW to perform LAMP on the MGNs for 30 minutes.

Figure 14:
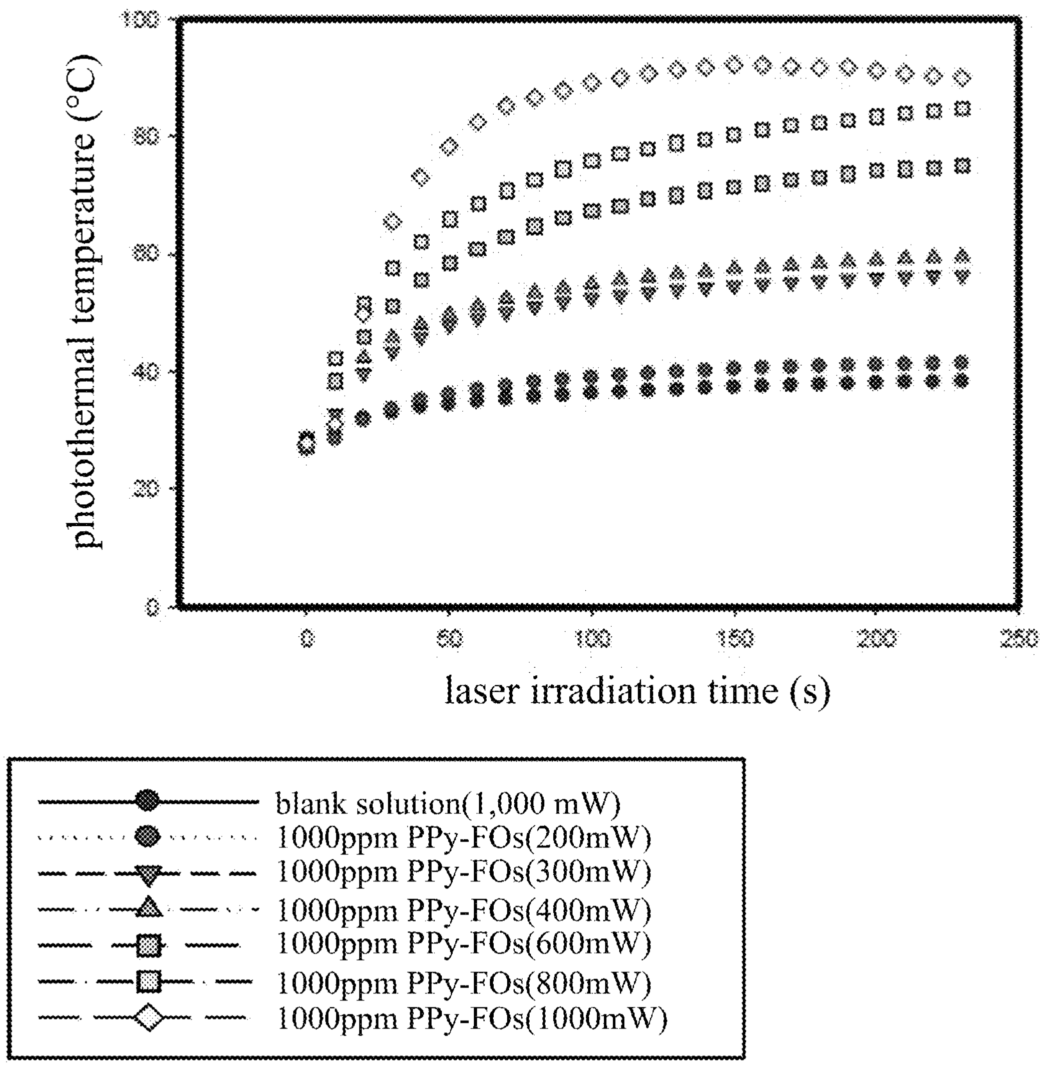
FIG. 14 shows that the photothermal heating curve at a steady status of polypyrrole-enveloped $Fe_3O_4$ particles (PPy-FOs) under 808 nm laser irradiations with various power (from 200 mW to 1000 mW). The magnetic nanoparticles are selected as polypyrrole-enveloped particles (PPy-FOs(200 mW)PPy-FOs) in one embodiment of the present disclosure.
Figure 15:
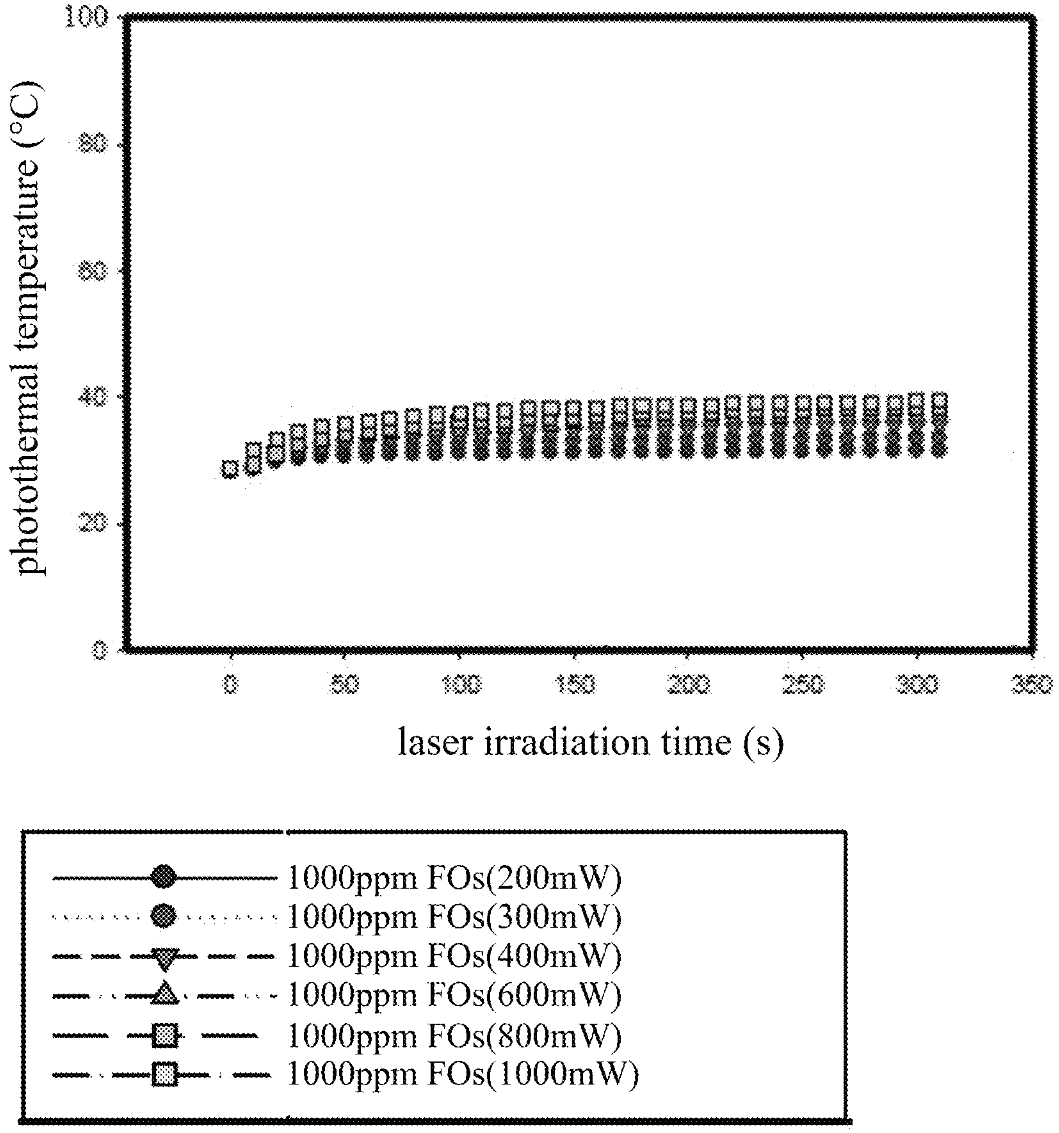
FIG. 15 shows that the photothermal heating curve at a steady status of $Fe_3O_4$ particles (FOs) under 808 nm laser irradiations with various power (from 200 mW to 1000 $mW/^2$). The magnetic nanoparticles are selected as FOs without the outer layer of polypyrrole in one embodiment of the present disclosure.
Figure 16:
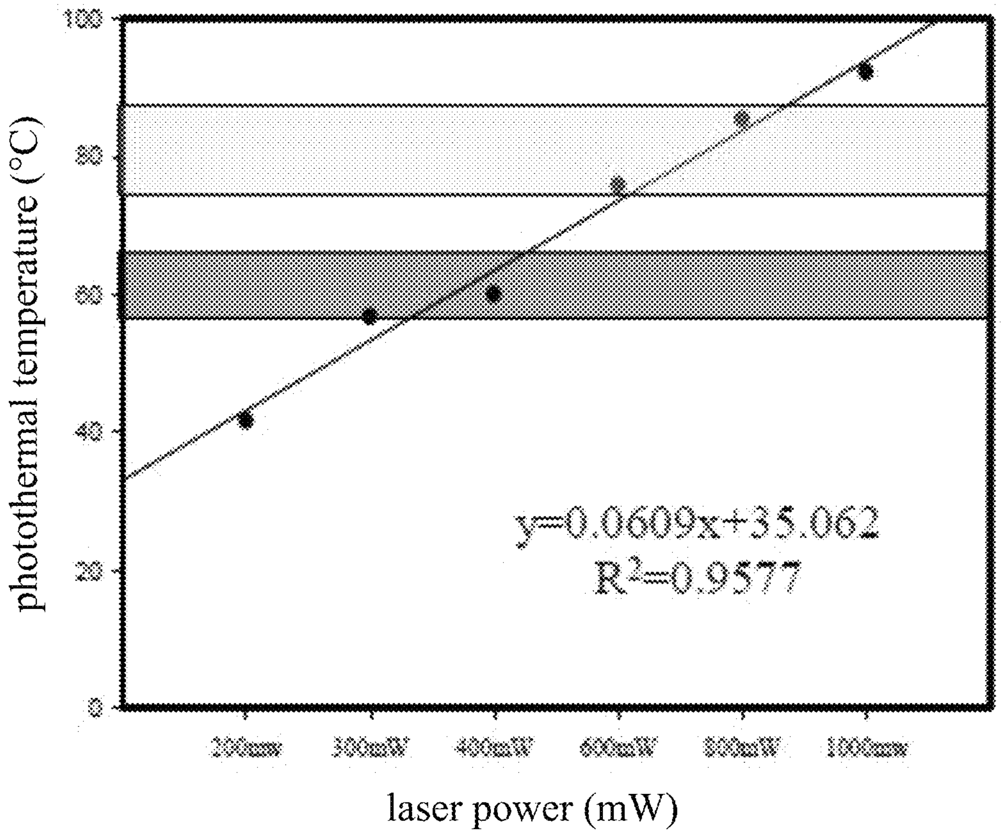
FIG. 16 shows that calibration curves of laser power and the TPT(ss) of the PPy-FOs. The magnetic nanoparticles are selected as PPy-FOs in one embodiment of the present disclosure.

Referring to FIG. 14 to FIG. 16, FIG. 14 is another embodiment of the present disclosure, the magnetic nanoparticles 300 is selected from polypyrrole-enveloped FOs particles (PPy-FOs) for performing the photothermal converted heating experiment. In this embodiment, the concentration of the magnetic nanoparticles 300 in water is 1,000 ppm. The energy supply module 500 uses an 808 nm laser as the external energy B to the magnetic nanoparticles 300 with different powers (200 mW to 1,000 mW).

Referring to FIG. 14 to FIG. 16, As shown in FIG. 14, the photothermal heating curve of PPy-FOs under 808 nm laser irradiations with various power (from 200 mW to 1000 mW) at a steady status. As shown in FIG. 15, the photothermal heating curve of $Fe_3O_4$ particles (FOs) under 808 nm laser irradiations with various power (from 200 mW to 1000 mW) at a steady status. The magnetic nanoparticles 300 are selected as $Fe_3O_4$ particles (FOs) without the outer layer of polypyrrole in one embodiment of the present disclosure. No significant change in photothermal temperature is found in the case of FOs (1000 ppm) under various 808 nm laser irradiations. In FIG. 16, the calibration curves of laser power and the photothermal converted temperature at a steady status of the PPy-FOs. The magnetic nanoparticles are selected as PPy-FOs in one embodiment of the present disclosure. In this embodiment, the surrounding temperature of PPy-FOs is heated through the photothermal effect with 808 nm laser for 300 seconds (i.e. the photothermal temperature around the PPy-FOs rises to a steady state), and a k-type thermocouple or infrared thermography is used to monitor the photothermal temperature changes during the entire heating process. As shown in FIG. 16, it reveals that the photothermal converted temperature at a steady status has a linear relationship with the laser energy intensity of the external energy source. In addition, in FIG. 16, the light and dark gray region indicate the appropriate temperature ranges of the PPy-FOs for performing the photothermal lysis and LAMP.

Figure 17:
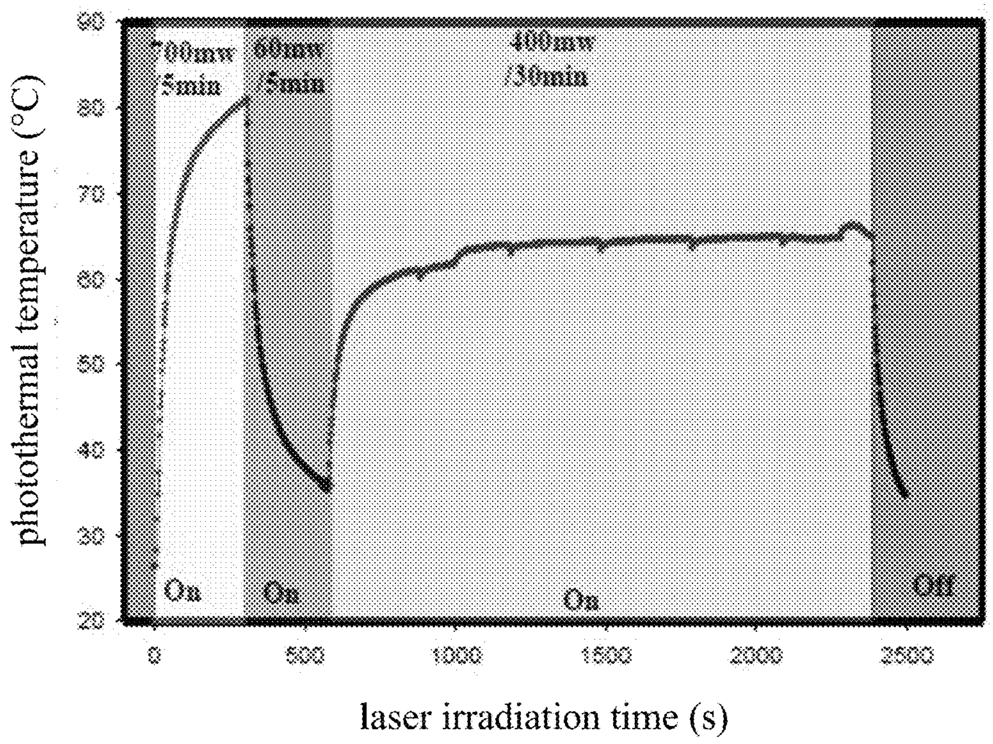
FIG. 17 shows that the actual photothermal temperature monitoring of PPy-FOs for photothermal lysis, DNA hybridization capture, and LAMP (loop-mediated isothermal amplification) implementations under various 808 nm laser irradiations was obtained from the abovementioned calibration curve. The PPy-FOs solution was used to perform photothermal lysis reaction and LAMP in one embodiment of the present disclosure.

As shown in FIG. 17, the actual photothermal temperature monitoring of PPy-FOs for photothermal lysis, DNA hybridization capture, and LAMP implementations under various 808 nm laser irradiations is obtained. Referring to FIG. 17, in this embodiment, firstly, the magnetic nanoparticles 300 (i.e., PPy-FOs) are irradiated with the 808 nm laser with the power of 500 mW to 1,000 mW for 5 minutes to perform photothermal lysis. Next, the PPy-FOs are irradiated with an 808 nm laser with a power of 20 mW to 80 mW, so that the reaction temperature of the generated by PPy-FOs can be slowly cooled down, resulting in the biological substance 202 can be recognized and captured by the second ligand 303-functionalized PPy-FOs. Finally, the PPy-FOs are irradiated with a laser with a power of 300 mW to 450 mW to perform photonic in-situ LAMP on the PPy-FOs for 30 minutes.

Figure 18:
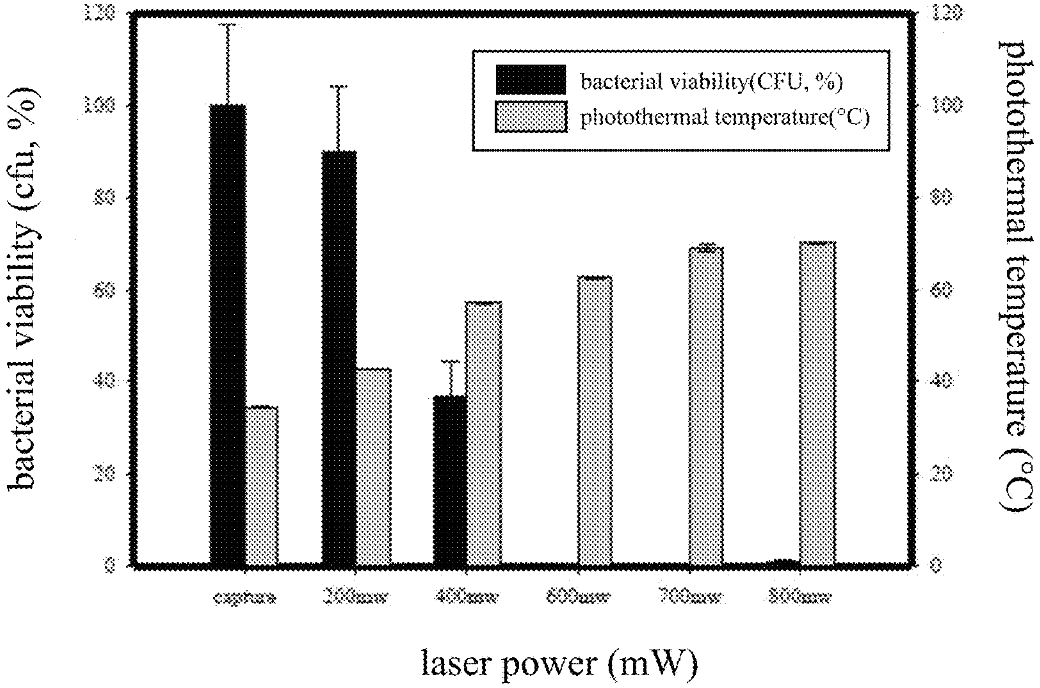
FIG. 18 shows that photothermal bactericidal property and temperature monitoring of dual functionalized PPy-FOs containing *Escherichia coli* exposed to 808 nm laser irradiation with various powers (0, 200, 400, 600, and 700 mW) for 5 min. The magnetic nanoparticles are selected from the PPy-FOs to lyse *E. coli* by photothermal heating in one embodiment of the present disclosure.

For further description based on the above-mentioned embodiment, please refer to FIG. 18. Photothermal bactericidal property and temperature monitoring of PPy-FOs solution containing *Escherichia coli* (*E. coli* ATCC35218, $1\times10^6$ CFU) exposed to 808 nm laser irradiation with various powers (0, 200, 400, 600, and 700 mW) for 5 min. The magnetic nanoparticles are selected from the PPy-FOs to lyse *Escherichia coli* (*E. coli*) by photothermal heating in one embodiment of the present disclosure.

FIG. 18 shows the relationship between the bacterial viability of target analyte 201 (e.g., *Escherichia coli; E. coli*) and the photothermal temperature generated by magnetic nanoparticles 300 (e.g., PPy-FOs) to lyse *E. coli* in one embodiment of the present disclosure. In this embodiment, the concentration of the magnetic nanoparticles 300 in water is 1,000 ppm. In this embodiment, under 808 nm laser irradiation with energy at 600 mW (e.g., the photothermal heating temperature at 58° C.) is sufficient to lyze the *E. coli*, However, the optimal power range for photothermal lysis of the analytes is at 700 mW to 800 mW (e.g., the photothermal heating temperature at 65 to 70° C.). In this embodiment, the optimal bactericidal performance of the photothermal temperature range is not the highest photothermal heating temperature, wherein the photothermal heating temperature refers to the temperature for performing photothermal lysis.

Figure 19:
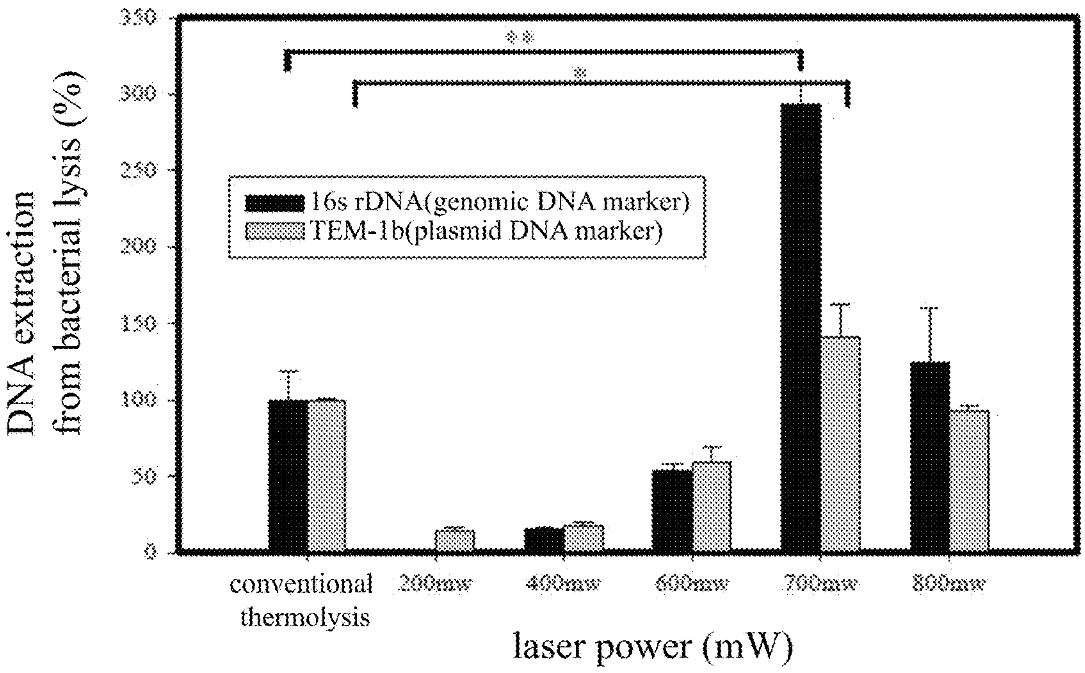
FIG. 19 shows that comparison of rapid DNA extraction efficiency through photothermal lysis with PPy-FOs at different laser power and conventional thermal lysis. Q-PCR for TEM-1β and 16 S rDNA were selected to evaluate the DNA extraction efficiency of plasmid DNA and genomic DNA from bacteria, respectively.

Based on the previous embodiment, please refer to FIG. 19. Comparison of rapid DNA extraction efficiency through photothermal lysis with PPy-FOs serving as “microheaters” and conventional thermal lysis (95° C. for 10 min). Q-PCR for TEM-1β and 16 S rDNA were selected to evaluate the DNA extraction efficiency of plasmid DNA and genomic DNA, respectively. In this embodiment, the magnetic nanoparticles 300 are chosen from PPy-FOs (i.e., first ligand 302 and second ligand 303 are modified on the surface of PPy-FOs; at 1000 ppm particle concentration), and laser setups of photothermal lysis are 808 nm laser power at the 200, 400, 600, 700 and 800 mW for 5 minutes. As shown in FIG. 19, the optimal laser setup for performing DNA extraction lysis including plasmid DNA and genomic DNA is 808 nm laser power at 700 mW for 5 minutes, the DNA extraction efficiency of photothermal lysis driven by NIR laser and PPy-FOs is better than the conventional thermal lysis conducted by heat conduction via thermal block of PCR machine.

Figure 20:
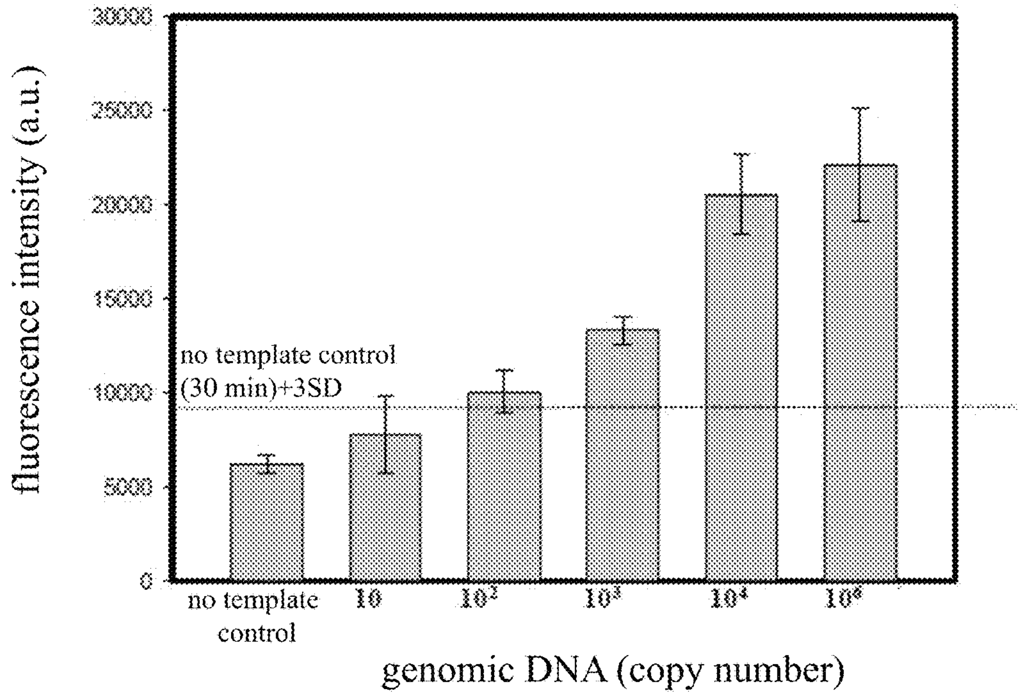
FIG. 20 shows that evaluation of the analytical sensitivity of photonic in-situ LAMP platform with various copy number of *E. coli* genomic DNA by using fluorescence intensity.
Figure 21:
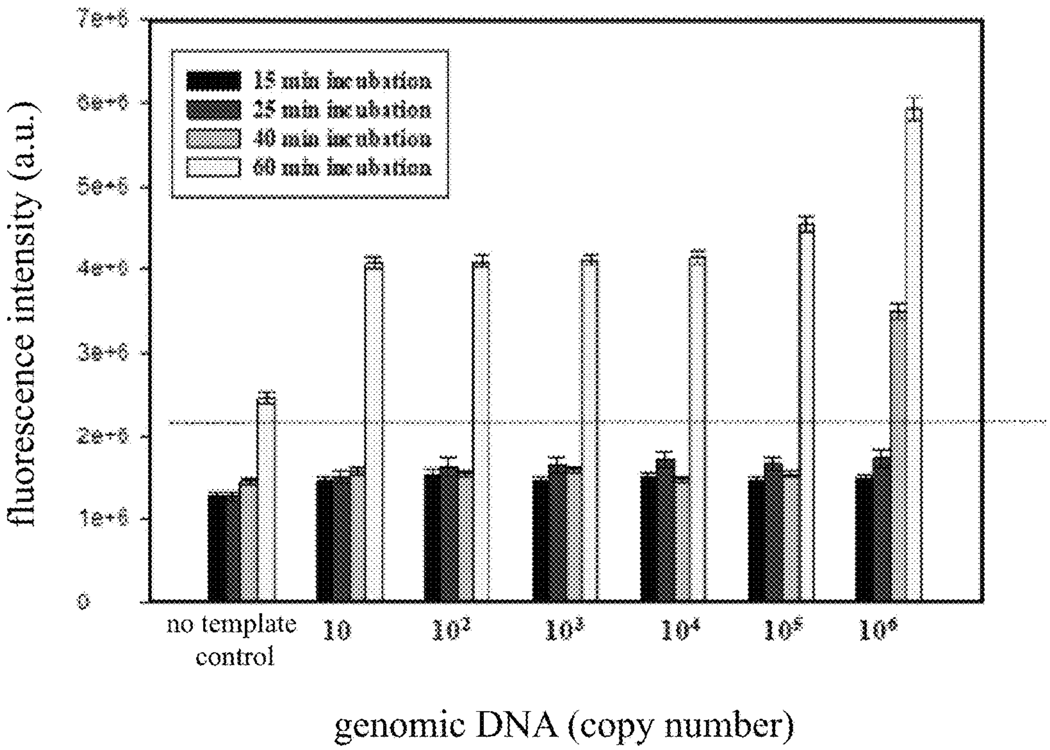
FIG. 21 shows that performance comparison of conventional LAMP for *E. coli*, the analytic sensitivity and response time of conventional LAMP assays were evaluated by fluorometer. The sensitivity of conventional LAMP was evaluated by using fluorescence intensity at different time intervals with various copy number of *E. coli* genomic DNA.

Based on the previous embodiment, please refer to FIG. 20. Evaluation of the analytical sensitivity of photonic in-situ LAMP with various copy number of *E. coli* genomic DNA by using fluorescence intensity. As shown in FIG. 20, the limit of detection (LOD) is estimated through a threshold (i.e., the mean of fluorescence intensity of the no template control plus three-time standard deviations of the no template control), the LOD of photonic in-situ LAMP is estimated at $10^2$ and $10^3$ copy number per reaction. Moreover, please refer to FIG. 21, performance of conventional *E. coli* LAMP was evaluated with various copy number of *E. coli* genomic DNA and fluorescence intensity. The response time of conventional *E. coli* LAMP assays is highly dependent on the concentration of the target templates, and there was no obvious difference in fluorescence intensity from 10 to 6 copies of *E. coli* genomic DNA over 25 min unless the incubation time was prolonged to 40 and 60 min. Although the LOD of the conventional *E. coli* LAMP assay was as low as approximately 10 copies per reaction (at a period of 60 min incubation). As compared with the analytical performance of *E. coli* LAMP and photonic in-situ LAMP (FIG. 20 and FIG. 21), the latter has better analytical sensitivity in short response time (at a period of 30 min incubation).

Figure 22:
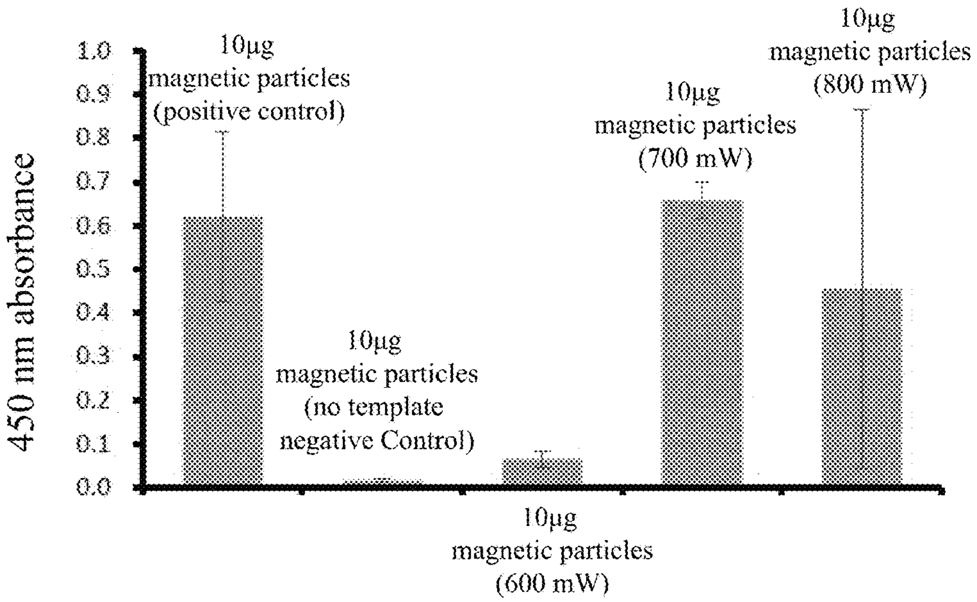
FIG. 22 shows that evaluation of the analytical sensitivity of photonic in-situ LAMP platform with various laser power by using bead-based ELISA.

In this embodiment, referring to FIG. 22. Evaluation of the overall performance of the photonic in-situ LAMP (i.e., target analyte enrichment, photothermal lysis, DNA hybridization capture, and photonic in-situ LAMP) by using bead-based ELISA. Similarly, when the laser (808 nm) power of 700 mW to 800 mW is applied, the protein signal performance of the analyte 201 is better. In detail, After completing the enrichment procedures of target analytes, various power of 808 nm laser are used for performing the procedures of photothermal lysis and DNA extraction (e.g., 600 mW, 700 mW and 800 mW for 5 min), the captured biological substance 202 on PPy-FOs will use as templates for subsequent photonic in-situ LAMP. The bead-based ELISA permits to determine LAMP amplicons on PPy-FOs through colorimetric methods. According to our results, the bead-based ELISA reveals that the photothermal lysis with 808 nm laser energy at 700 mW has better amplification efficiency in photonic in-situ LAMP, those results are consistent with DNA extraction experiment with PPy-FOs under 700 mW for 5 min (FIG. 19).

Figure 23:
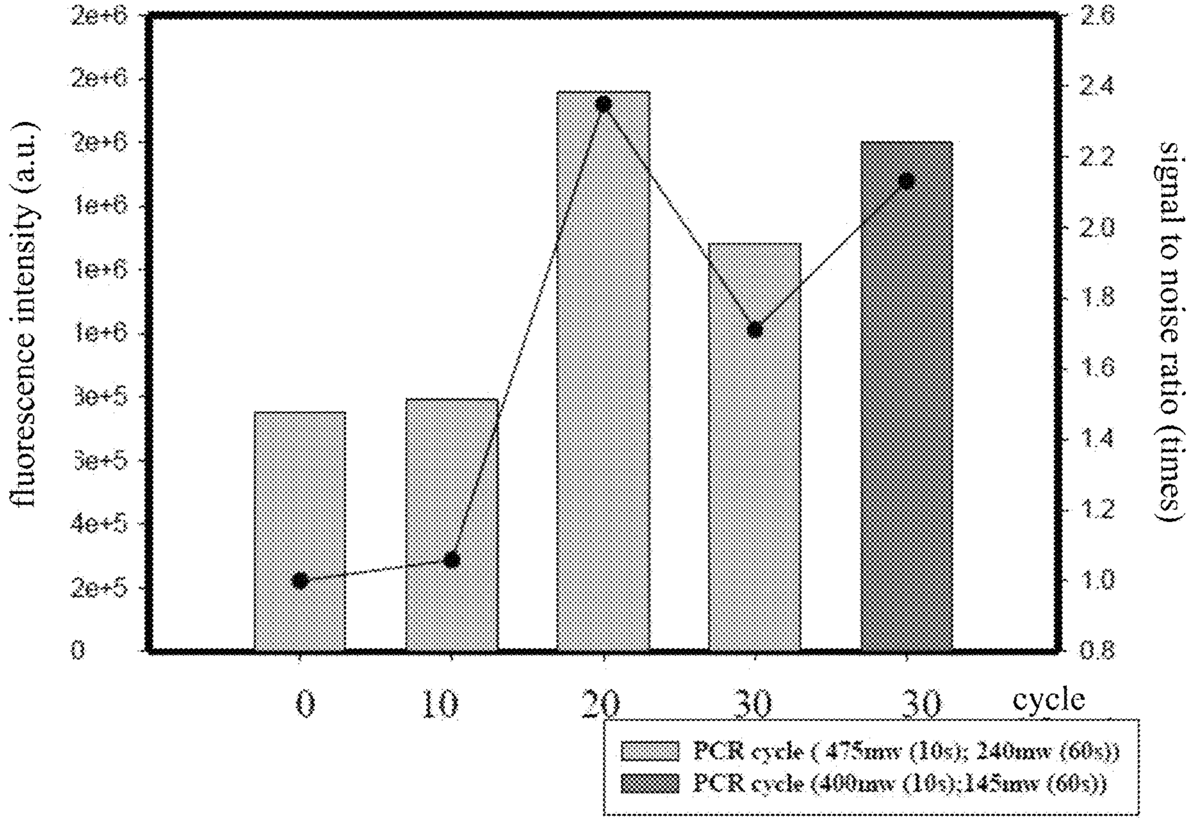
FIG. 23 shows that the performance of photonic in-situ PCR with MGNs was evaluated at different photonic amplification cycles (i.e., two steps for PCR), including various laser settings. The normalized fluorescent signals of amplicons on MGNs were measured with fluorometer.

Referring to FIG. 23. The performance of photonic in-situ PCR with MGNs was evaluated at different photonic amplification cycles (i.e., two steps for PCR), including various laser settings (e.g., laser power outputs, the sequential on/off procedure, and time of NIR laser irradiation). The normalized fluorescent signals of amplicons on MGNs were measured with fluorometer. In this embodiment, the magnetic nanoparticles 300 were selected from MGNs. Different lasers powers are used in different steps for performing two steps of PCR (i.e., steps for DNA denaturation and primer annealing/extension). In the first embodiment, a photonic amplification cycle comprises two laser setups, one is irradiating with 808 nm laser at 475 mW for 10 seconds (i.e., for DNA denaturation), and the other is followed by irradiating with 808 nm laser at 240 mW for 60 seconds (i.e., for primer annealing and extension). In the second embodiment, a photonic amplification cycle comprises irradiating with 808 nm at 400 mW for 10 seconds (i.e., for DNA denaturation), followed by irradiating with 808 nm laser 145 mW for 60 seconds (i.e., for primer annealing and extension). As shown in FIG. 23, the signal readouts of in-situ amplicons on MGNs rapidly achieves to saturation at 20 photonic amplification cycles, but signal readout is decreased at 30 photonic amplification cycles, which may be caused by primer detachment during an inappropriate laser setup (i.e., a relative high localized heating generated by a high). Further, in the second embodiment, the signal readouts of in-situ amplicons on MGNs are accumulated with the increase of photonic amplification cycles. In other words, in the second embodiment, the 808 nm laser setups are more suitable for performing photonic in-situ PCR. Based on the aforementioned experimental results, the fluorescence intensity generated by amplicons is proportional to the number of photonic amplification cycles, and the amplicons on the MGNs is limited by the carrying capacity of the MGNs.

Although particular embodiments of the present invention have been described in detail for purposes of illustration, various modifications and enhancements may be made without departing from the spirit and scope of the present invention. Accordingly, the present invention is not to be limited except by the appended claims.

What is claimed is:

1. An in-situ nucleic acid amplification system, comprising:

a reaction space;

a sample placed in the reaction space and including at least one analyte, wherein the at least one analyte comprises an individual microbe or a cell;

a plurality of particles mixed with the sample in the reaction space, wherein the plurality of particles are magnetic nanoparticles, each of the plurality of particles including:

a body configured to have at least one property of photothermal conversion or thermomagnetic conversion, and configured to generate heat via external energy excitation;

at least one first ligand functionalized on the body and configured to match the at least one analyte, wherein the at least one first ligand comprises an antibody, an aptamer, an oligonucleotide, or a combination thereof; and at least one second ligand functionalized on the body through a stabilizing bond, wherein the at least one second ligand is a single-strand nucleic acid sequence having a complementary sequence to a corresponding target gene of at least one biological substance released from the analyte or a cell-free nucleic acid, wherein the at least one second ligand is configured to bind the at least one biological substance or the cell-free nucleic acid on the body;

at least one enzyme mixed with the sample, wherein the at least one enzyme is a polymerase;

at least one tag mixed with the sample, wherein the at least one tag is a fluorescent or a nucleic acid tag;

at least one energy supply module configured to provide external energy to the plurality of particles, wherein the external energy comprises light energy or an alternating magnetic field;

at least one temperature equilibrium substance placed in the reaction space, wherein the temperature equilibrium substance is a cooling substance, and comprises a nucleic acid amplification solution or an ice pack externally in contact with the reaction space to cool down the nucleic acid amplification reaction on the plurality of particles; and an operating module configured to control the plurality of particles in the reaction space, wherein the operating module is a magnetic component configured to concentrate and focus the analyte and the free nucleic acid substance and amplicons incorporated with the at least one tag on the plurality of particles;

wherein the at least one energy supply module is configured to excite the plurality of particles to generate a reaction temperature range for performing photothermal lysis, DNA hybridization capture and nucleic acid amplification, and the at least one temperature equilibrium substance is configured to maintain a constant temperature range for isothermal amplification or to achieve rapid temperature cycling for PCR by controlling the energy supply module with assistance of the at least one temperature equilibrium substance; and wherein the at least one enzyme is configured to amplify, on the body, the at least one biological substance or the cell-free nucleic acid captured by the at least one second ligand, such that amplicons generated from the at least one biological substance or the cell-free nucleic acid are captured by the plurality of particles.

2. The nucleic acid amplification system of claim 1, wherein the at least one temperature equilibrium substance is a cooling substance.

3. The nucleic acid amplification system of claim 1, wherein the at least one analyte comprises at least one cell, at least one organelle, at least one bacterium, at least one virus, at least one protist, at least one cell-free nucleic acid or a combination thereof.

4. The nucleic acid amplification system of claim 3, wherein the at least one cell-free nucleic acid comprises cell-free nucleic acid derived from body fluid, tumor or a combination thereof.

5. The nucleic acid amplification system of claim 1, wherein each of the at least one first ligand and the at least one second ligand is functionalized on the body through a stabilizing structure, and the stabilizing structure comprises a thermostable bond, a contact inhibition coating or a combination thereof.

6. The nucleic acid amplification system of claim 1, wherein the at least one enzyme is a polymerase.

7. The nucleic acid amplification system of claim 6, wherein the polymerase further comprises DNA polymerase, RNA polymerase or a combination thereof.

8. The nucleic acid amplification system of claim 6, wherein the polymerase further comprises a reverse transcriptase (RT), a ribonuclease (RNase), a helicase, a DNA ligase or a combination thereof.

9. The nucleic acid amplification system of claim 1, wherein the energy supply module comprises a laser transmitter, a light-emitting diode or a magnetic field generator.

10. The nucleic acid amplification system of claim 1, wherein the operating module comprises a magnetic component, a centrifuge or a combination thereof.

11. The nucleic acid amplification system of claim 10, wherein the magnetic component serves as the operating module, and the plurality of particles comprises a plurality of magnetic particles.

12. The nucleic acid amplification system of claim 1, further comprising a detection module that detects the specific tags in each of the at least one second ligand of the plurality of particles concentrated by the operating module.

13. A method for operating the nucleic acid amplification system of claim 1, comprising the steps of:

(a) mixing the sample and the plurality of particles so that the at least one first ligand of the plurality of particles matches the at least one analyte and captures the at least one analyte, wherein the at least one first ligand comprises an antibody, an aptamer, an oligonucleotide or a combination thereof;

(b) using the operating module to remove an impurity and concentrate the sample in the reaction space, wherein the sample includes the at least one analyte, and wherein step (e) immediately follows the step (b) if the at least one analyte is a cell-free nucleic acid, otherwise step (c) is performed;

(c) in which the at least one energy supply module provides the external energy to the plurality of particles so that a temperature of the plurality of particles rises to a thermolysis temperature;

(d) lysing the at least one analyte, thereby releasing at least one biological substance;

(e) in which the at least one energy supply module provides the external energy to the plurality of particles up to a hybridization capture temperature, so that the at least one second ligand captures the at least one biological substance released from the at least one analyte; and (f) providing the external energy to the plurality of particles up to an amplification temperature with the at least one energy supply module, and then using the enzyme to amplify the at least one biological substance on the plurality of particles, so that the at least one biological substance that is amplified is tethered on the plurality of particles.

14. The method of claim 13, after step (f), further comprising step (g), wherein the step (g) follows the step (f), and wherein a detection module is used in the step (g) to detect a colorimetric change, a luminescence or a combination thereof caused by the specific tags on the at least one biological substance or the cell-free nucleic acid that is amplified so as to detect the at least one biological substance or the cell-free nucleic acid, which is amplified, on the plurality of particles that is concentrated.

15. The method of claim 13, wherein the at least one enzyme is at least one polymerase, and the at least one polymerase is selected corresponding to the type of the at least one biological substance or the cell-free nucleic acid, and wherein the at least one polymerase comprises deoxyribonucleic acid polymerase (DNA polymerase) or ribonucleic acid polymerase (RNA polymerase).

16. The method of claim 13, wherein the operating module comprises a magnetic component, a centrifuge or a combination thereof.

17. The method of claim 13, wherein in the step (f), the method for amplifying the at least one biological substance or the cell-free nucleic acid comprises polymerase chain reaction (PCR) or an isothermal amplification reaction.

18. The method of claim 13, wherein in the step (f), the at least one temperature equilibrium substance rapidly cools the plurality of particles, thereby achieving rapid thermal cycling.

* * * * *